(12) United States Patent
Laschet

(10) Patent No.: US 12,137,842 B2
(45) Date of Patent: Nov. 12, 2024

(54) ICE CREAM SCOOP OR SCOOP FOR ANOTHER FOOD OF SEMISOLID CONSISTENCY

(71) Applicant: Paolo Laschet, Chonburi (TH)

(72) Inventor: Paolo Laschet, Chonburi (TH)

( * ) Notice: Subject to any disclaimer, the term of this patent is extended or adjusted under 35 U.S.C. 154(b) by 918 days.

(21) Appl. No.: 17/255,554

(22) PCT Filed: Jan. 22, 2020

(86) PCT No.: PCT/IB2020/050476
§ 371 (c)(1),
(2) Date: Dec. 23, 2020

(87) PCT Pub. No.: WO2020/157602
PCT Pub. Date: Aug. 6, 2020

(65) Prior Publication Data
US 2021/0267418 A1    Sep. 2, 2021

(30) Foreign Application Priority Data
Jan. 28, 2019  (IT) .......................... 102019000001227

(51) Int. Cl.
*A47J 43/28*    (2006.01)
*A23G 9/24*    (2006.01)
(Continued)

(52) U.S. Cl.
CPC ............ *A47J 43/282* (2013.01); *A23G 9/245* (2013.01); *A23G 9/48* (2013.01); *B05B 1/14* (2013.01)

(58) Field of Classification Search
CPC ........ A47G 21/004; B05B 1/14; A47J 43/282; A23G 9/245
See application file for complete search history.

(56) References Cited

U.S. PATENT DOCUMENTS

| 160,852 A | * | 3/1875 | Thayer | .................... A24F 19/06 |
| | | | | 222/484 |
| 1,000,178 A | * | 8/1911 | Kahl | .................... B23D 59/006 |
| | | | | 222/206 |

(Continued)

FOREIGN PATENT DOCUMENTS

| CA | 1288418 C | * | 9/1991 | ............... A23G 9/28 |
| CN | 2542248 U | | 4/2003 | |

(Continued)

OTHER PUBLICATIONS

PCT International Search Report and Written Opinion issued by the International Bureau for PCT Application No. PCT/IB2020/050476, dated May 7, 2020, pp. 1-11.

(Continued)

*Primary Examiner* — Emmanuel S Luk
(74) *Attorney, Agent, or Firm* — LADAS & PARRY LLP

(57) ABSTRACT

The present invention relates to an ice cream scoop or scoop for another food of semisolid consistency, comprising a bowl or spatula and a handle carrying said bowl or spatula, said scoop being adapted to make a portion in said bowl or spatula, preferably a spherical portion, of said ice cream or other food, when said bowl or spatula is moved through a bulk of said ice cream or other food. According to the invention, the scoop comprises dispensing means of at least one food sauce suitable for dispensing said food sauce on and/or within said ice cream or other food portion during the formation of said ice cream or other food portion in said bowl or spatula.

31 Claims, 24 Drawing Sheets

(51) Int. Cl.
  *A23G 9/48* (2006.01)
  *B05B 1/14* (2006.01)

(56) References Cited

U.S. PATENT DOCUMENTS

| | | | | | |
|---|---|---|---|---|---|
| 1,238,429 | A * | 8/1917 | Nielsen | A47J 43/282 | 425/284 |
| 1,642,425 | A * | 9/1927 | Miller | A47G 19/34 | 222/456 |
| 1,698,716 | A * | 1/1929 | Cox | A47J 43/282 | 425/282 |
| 2,016,861 | A * | 10/1935 | Jennings, Jr. | B21D 53/62 | 30/328 |
| 2,252,119 | A * | 8/1941 | Edmonds | A61J 7/0053 | 222/215 |
| 2,260,689 | A * | 10/1941 | Miller | A47J 43/282 | 219/508 |
| 2,540,397 | A * | 2/1951 | Lawrence | A47J 43/282 | 425/280 |
| 2,550,210 | A * | 4/1951 | Vance, Jr. | A61J 9/00 | 215/11.1 |
| 2,837,822 | A * | 6/1958 | Wille | A61J 7/0023 | 222/215 |
| 2,953,170 | A * | 9/1960 | Bush | B65D 51/246 | 401/266 |
| 3,090,071 | A | 5/1963 | Le Brooy | | |
| 3,299,838 | A * | 1/1967 | Thietje | A47J 43/282 | 219/241 |
| 3,410,457 | A | 11/1968 | Brown | | |
| 3,473,221 | A * | 10/1969 | Flanders | A47G 21/04 | 30/141 |
| 3,612,358 | A * | 10/1971 | Massa | A61J 7/0046 | 222/441 |
| 3,809,520 | A * | 5/1974 | Wilk | A47J 43/282 | 30/140 |
| 4,830,222 | A * | 5/1989 | Read | B65D 35/28 | 426/115 |
| 4,880,409 | A * | 11/1989 | Bergkvist | A61J 7/0053 | D24/116 |
| 4,888,188 | A * | 12/1989 | Castner, Sr. | B65D 81/3484 | 222/146.2 |
| 4,957,226 | A * | 9/1990 | Pacia | A47G 21/08 | 401/266 |
| 5,326,248 | A * | 7/1994 | Thuecks | A47J 43/282 | 425/276 |
| 5,368,195 | A * | 11/1994 | Pleet | G01F 11/22 | 222/105 |
| 5,377,879 | A * | 1/1995 | Isaacs | G01F 19/002 | 604/218 |
| 5,462,101 | A * | 10/1995 | Mouchmouchian | B65D 77/245 | 141/366 |
| 5,491,895 | A * | 2/1996 | Lee | A61J 7/0023 | 30/141 |
| 5,894,959 | A * | 4/1999 | Sigurlidason | A47G 21/005 | 401/266 |
| 6,102,254 | A * | 8/2000 | Ross | A61P 31/04 | 141/114 |
| 6,279,233 | B1 * | 8/2001 | Cameron | A61J 7/0046 | 30/125 |
| 6,347,727 | B1 * | 2/2002 | Diaz | A61J 7/0023 | 222/541.9 |
| 6,675,482 | B1 * | 1/2004 | Gilbert, Jr | A61J 7/0053 | 222/258 |
| 6,928,870 | B1 * | 8/2005 | Liebowitz | G01F 19/002 | D10/46.3 |
| 7,975,386 | B1 * | 7/2011 | Halvorson | A47G 21/004 | 222/93 |
| 8,020,303 | B1 * | 9/2011 | Marsh | A47G 21/004 | 30/125 |
| 8,038,037 | B2 * | 10/2011 | deVirag | G01F 11/086 | 30/141 |
| 11,285,084 | B2 * | 3/2022 | Roux | A61J 9/006 | |
| D996,156 | S * | 8/2023 | Umholtz | D7/681 | |
| 2002/0148852 | A1 | 10/2002 | Schultz | | |
| 2004/0170211 | A1 * | 9/2004 | Paul | G01K 1/14 | 374/100 |
| 2010/0325895 | A1 * | 12/2010 | Geissler | A47G 21/004 | 30/322 |
| 2012/0066911 | A1 | 3/2012 | Hicks | | |

FOREIGN PATENT DOCUMENTS

| | | |
|---|---|---|
| CN | 207545487 U | 6/2018 |
| JP | 3186696 U | 10/2013 |
| WO | 80/02875 A1 | 12/1980 |

OTHER PUBLICATIONS

PCT International Second Written Opinion issued by the International Bureau for PCT Application No. PCT/IB2020/050476, dated Nov. 17, 2020, pp. 1-6.

First Chinese Office Action and Search Report issued for copending application 202080011274.4 on Jan. 10, 2024.

* cited by examiner

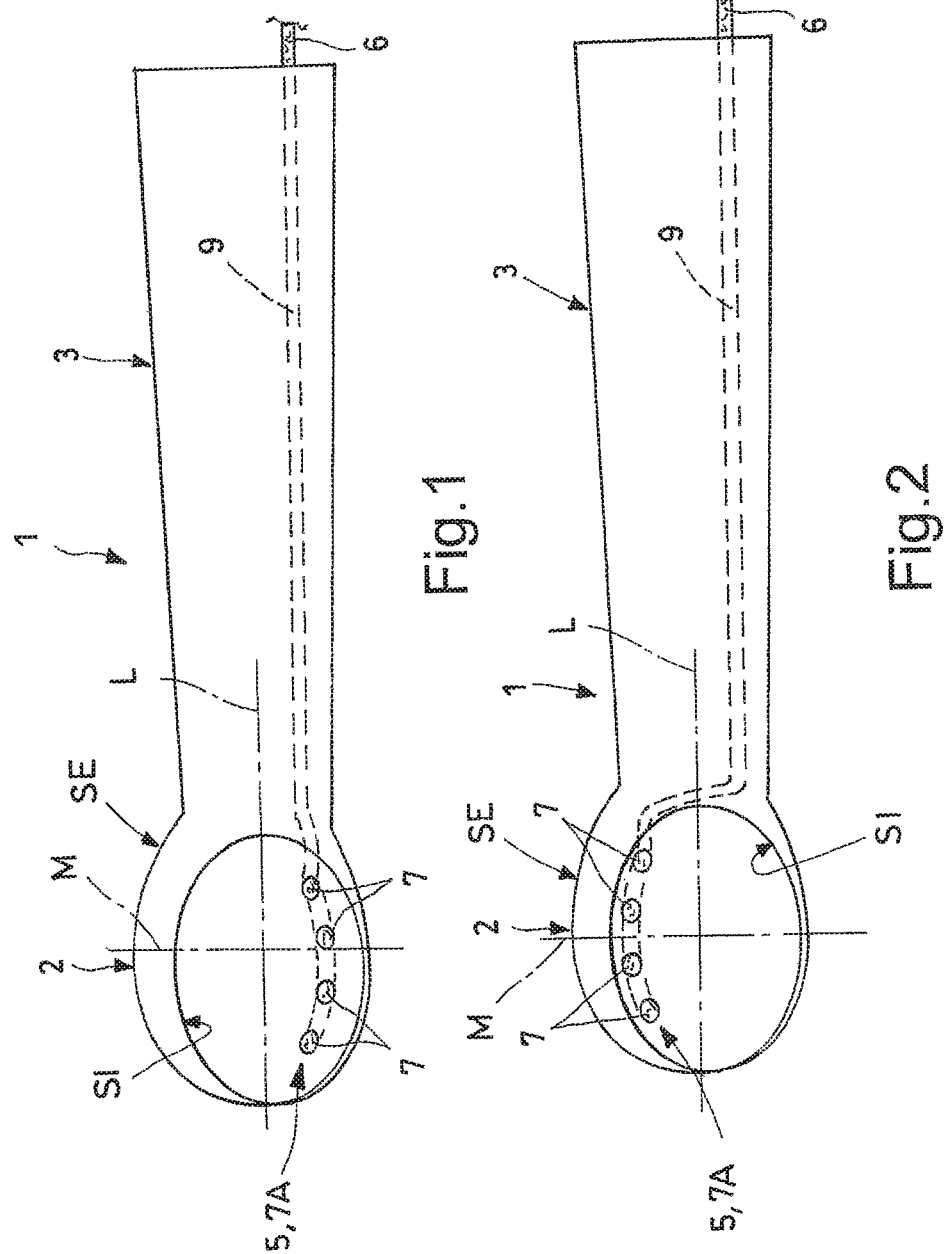

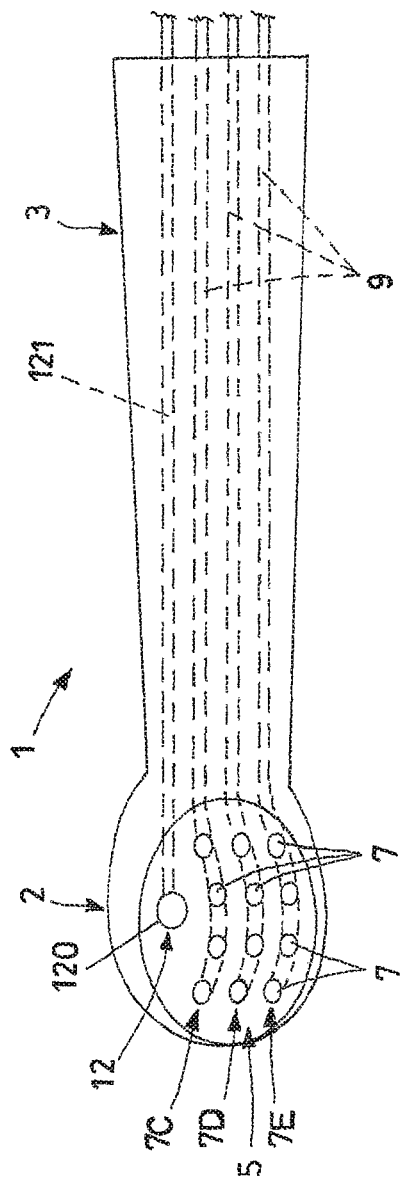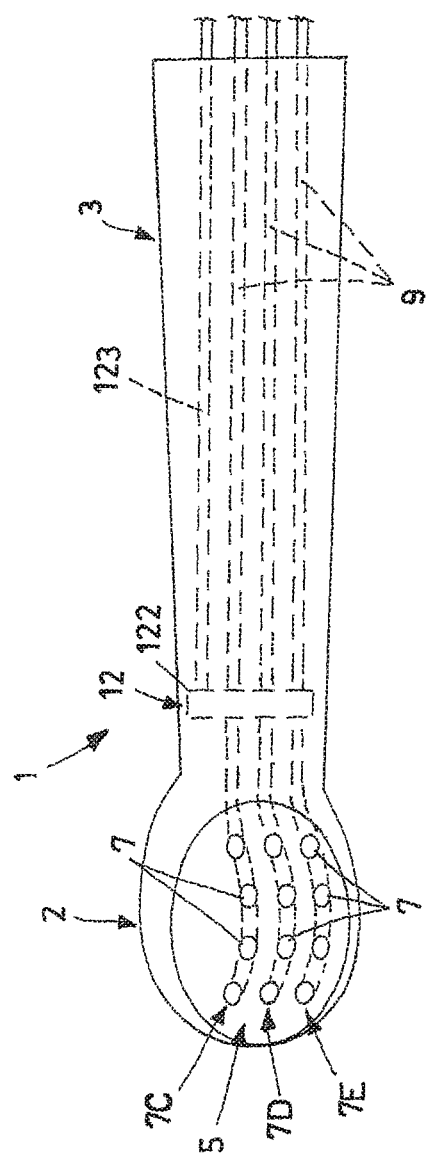

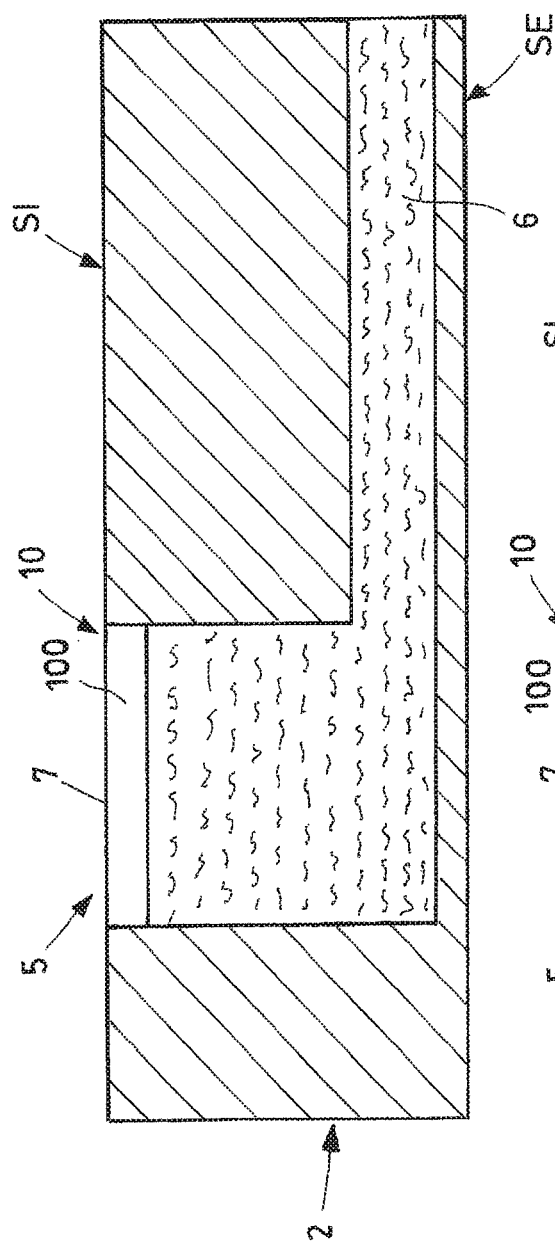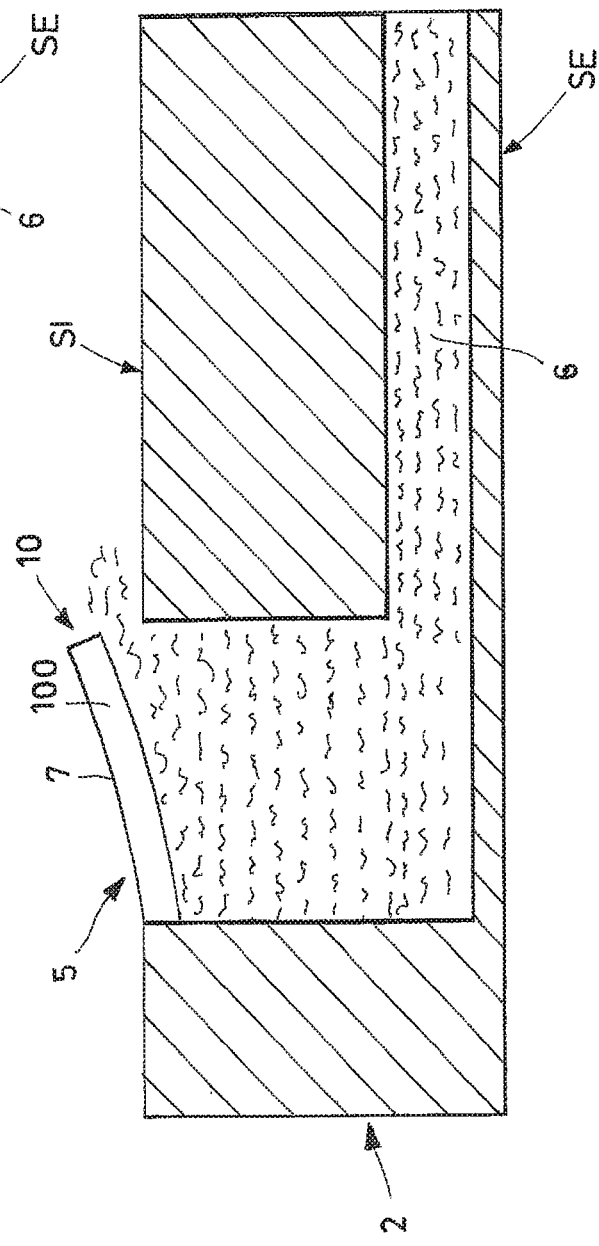

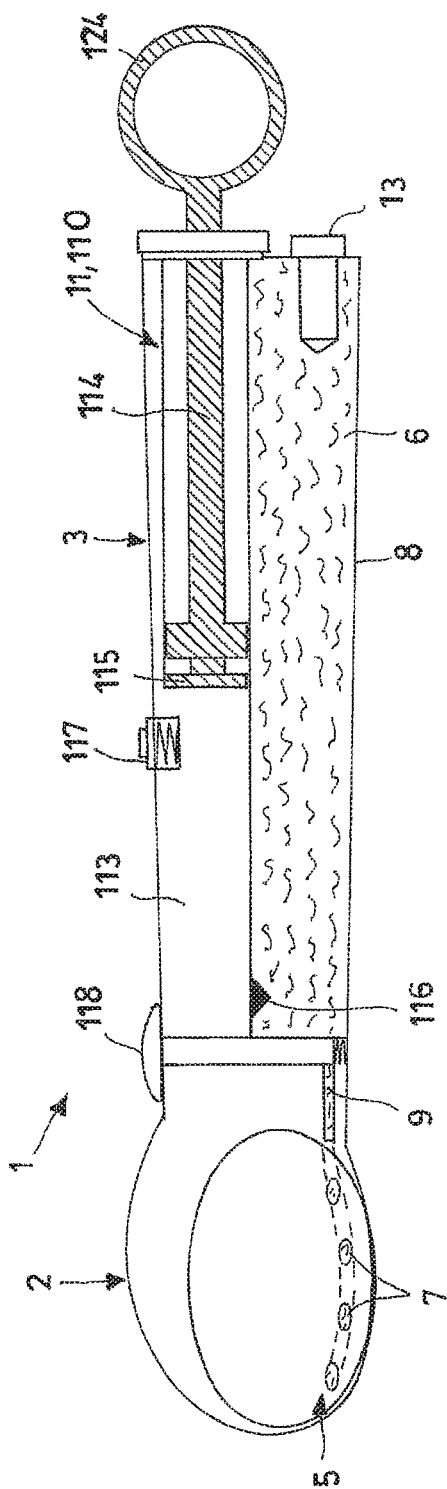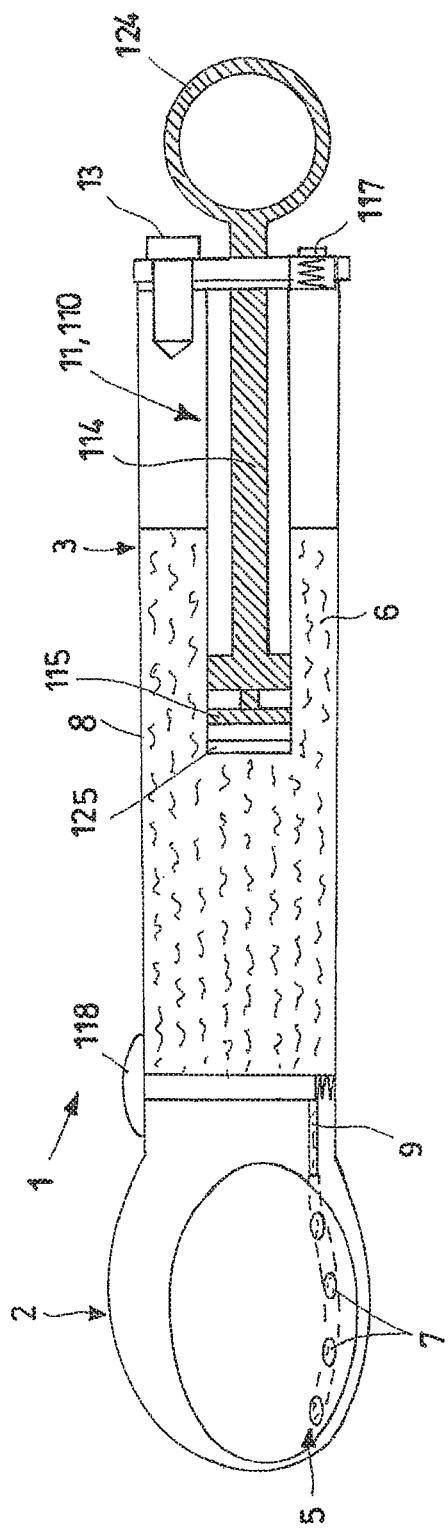

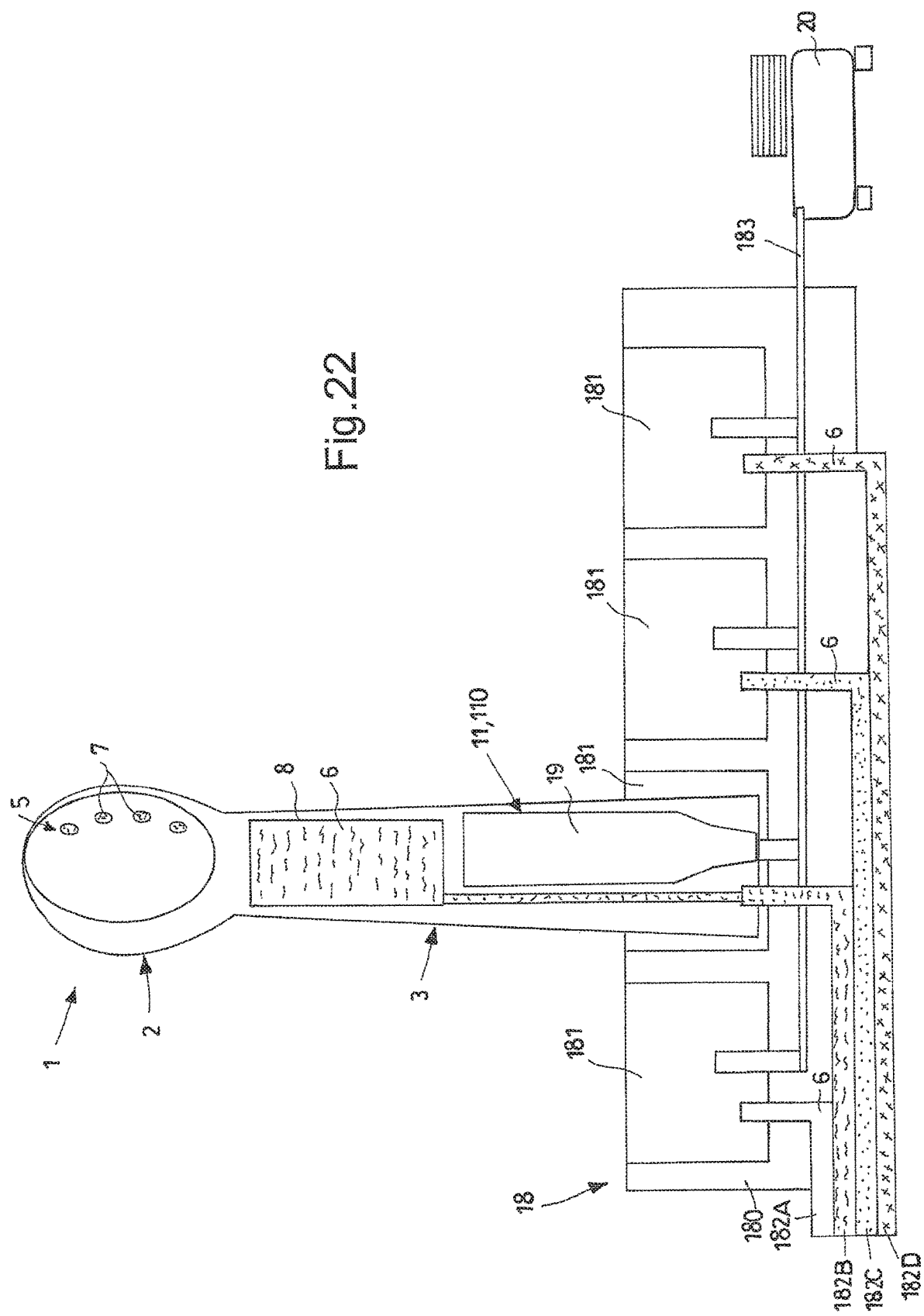

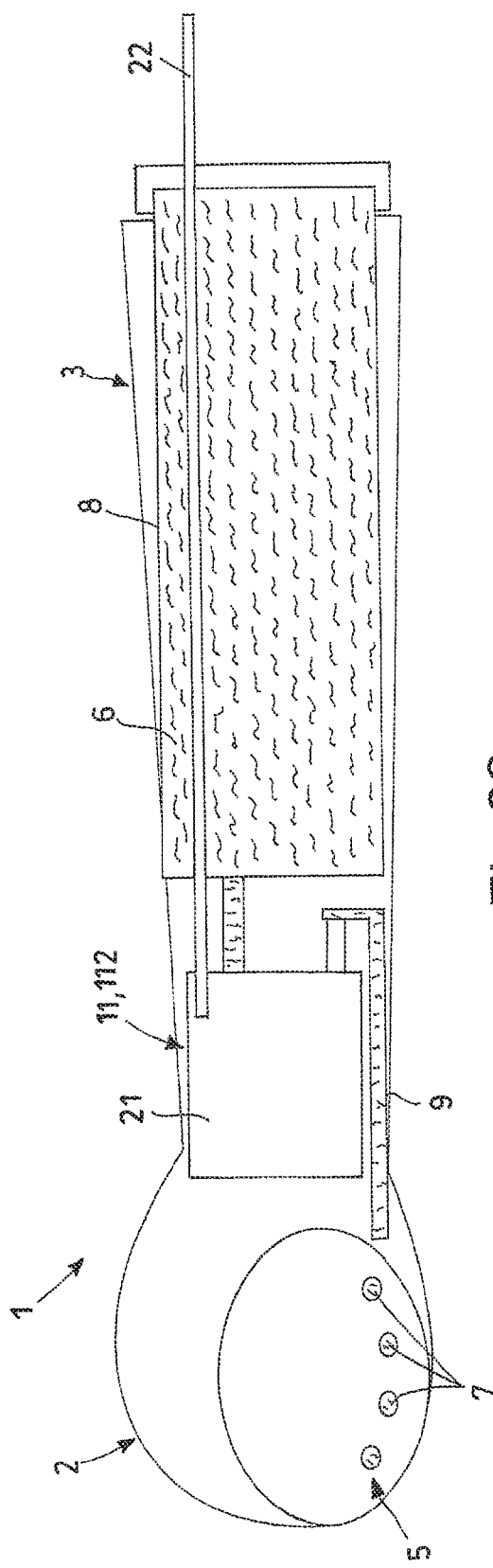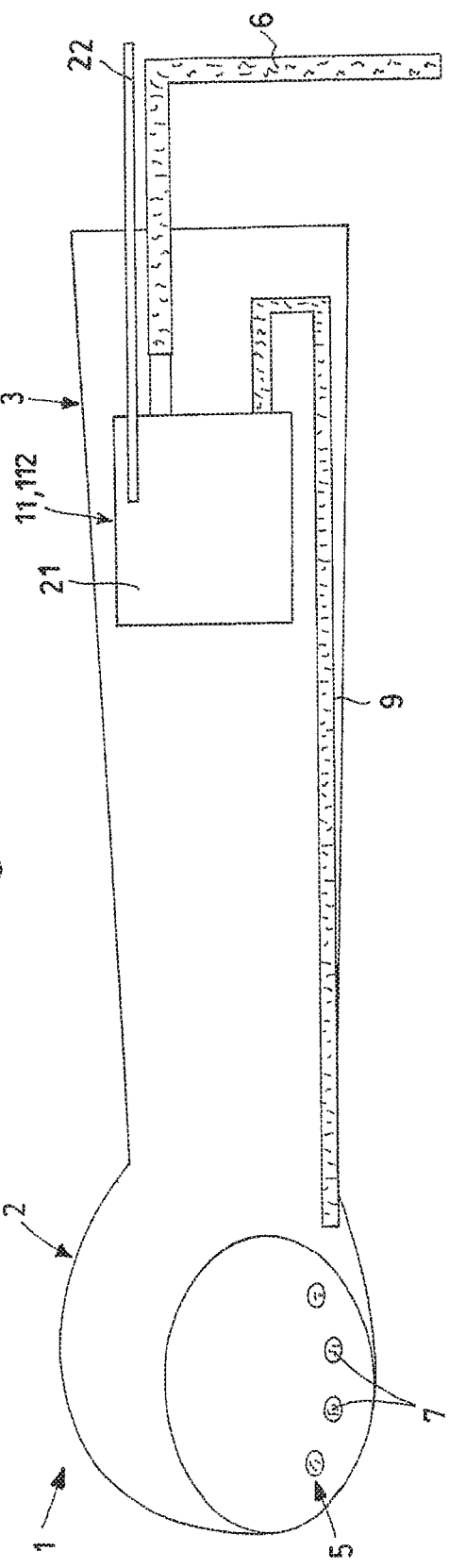

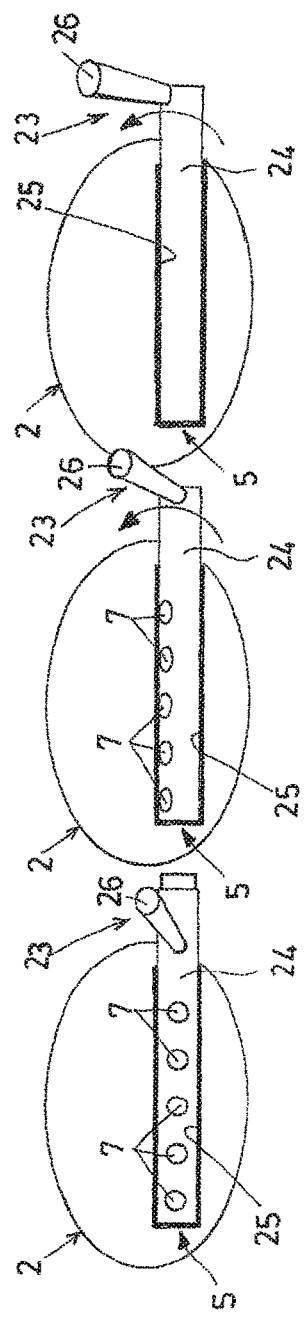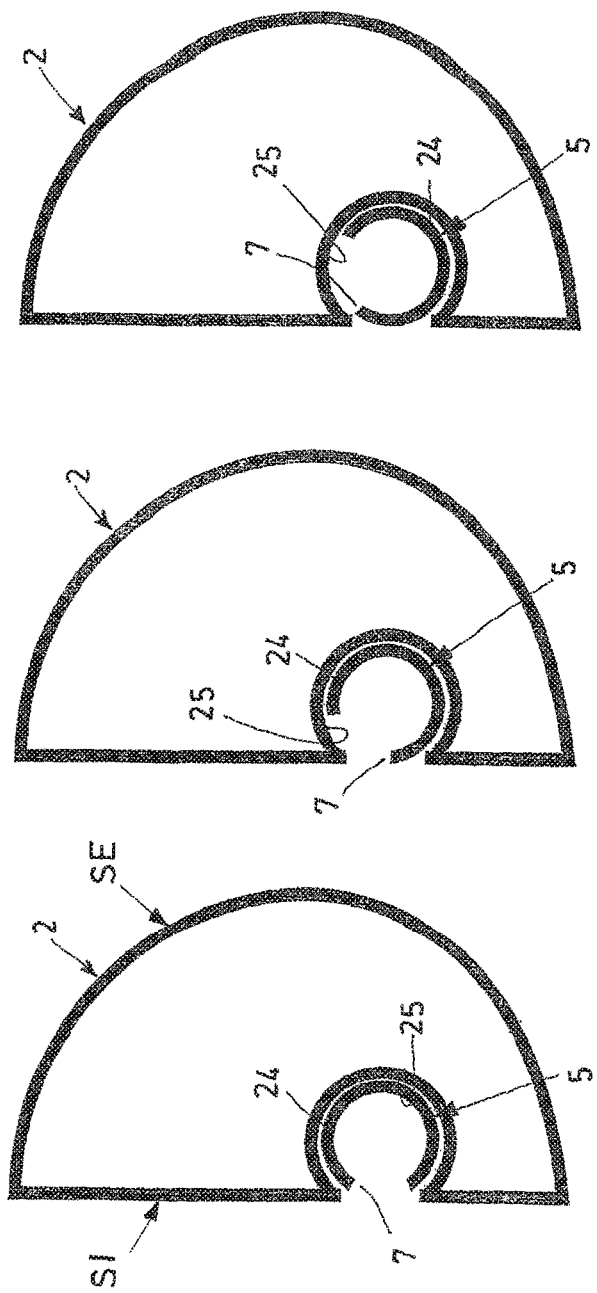

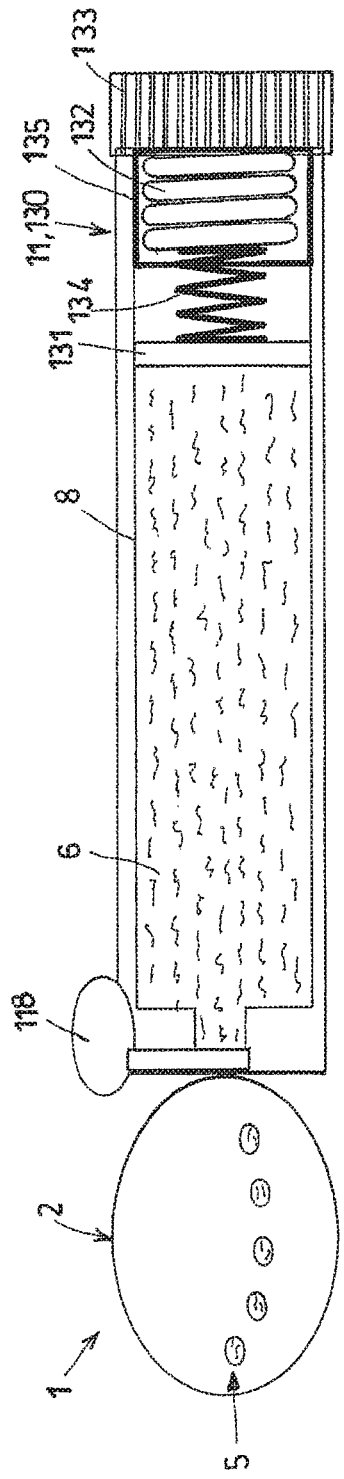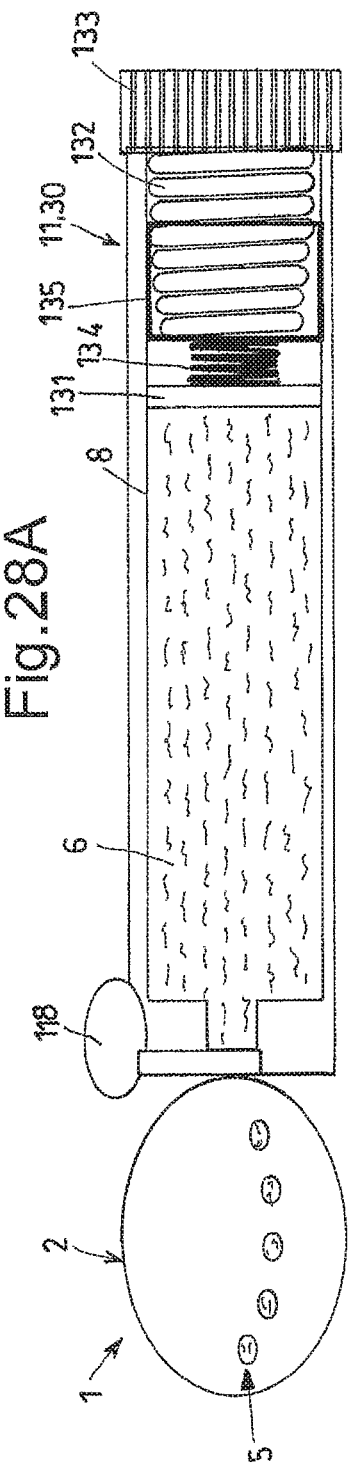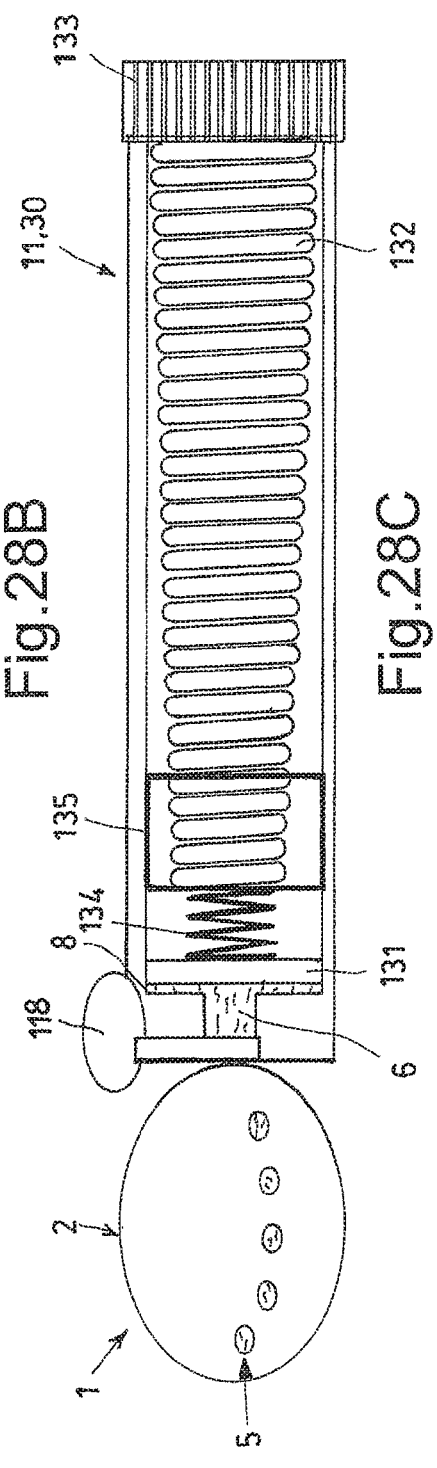

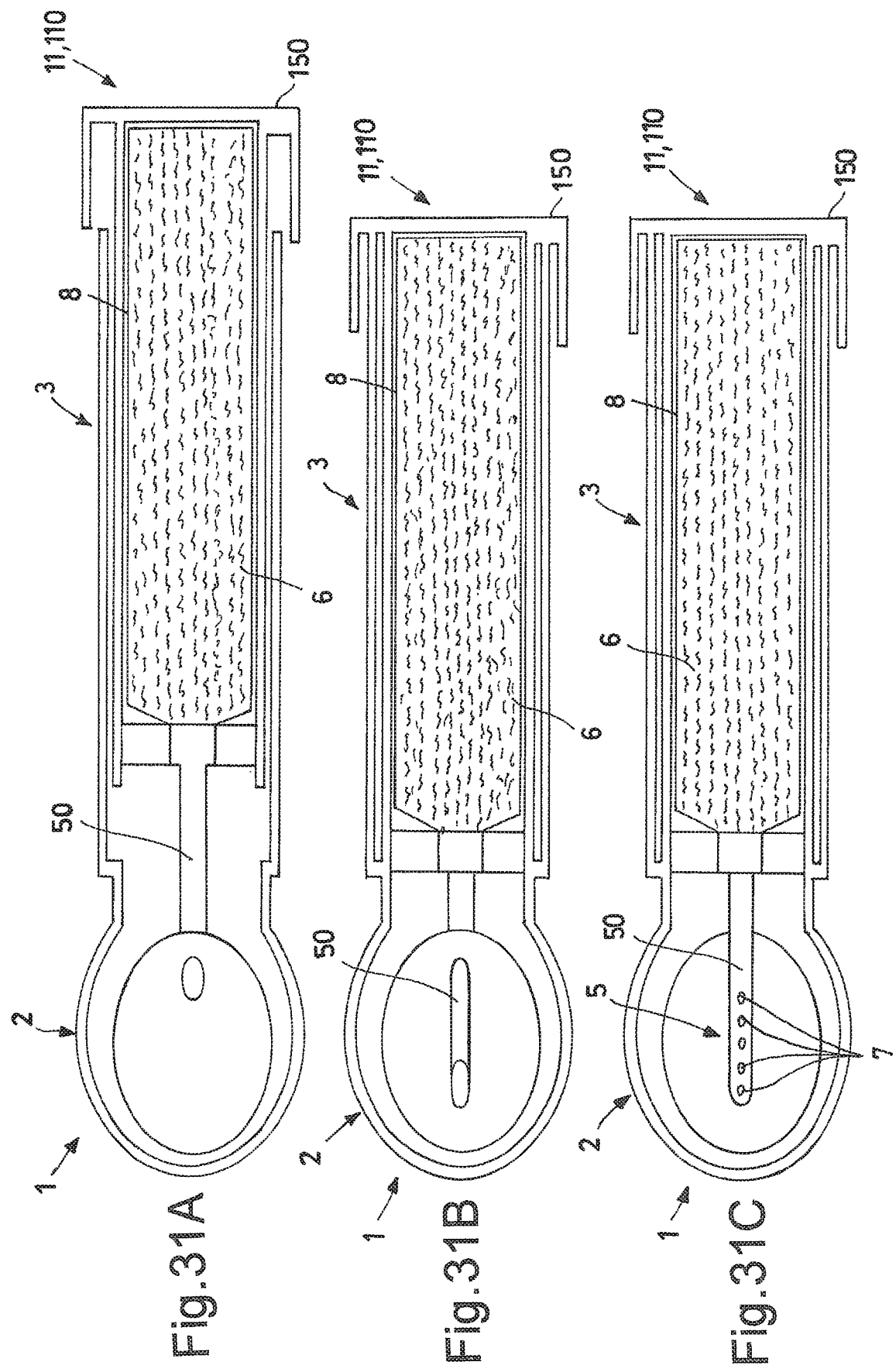

ICE CREAM SCOOP OR SCOOP FOR ANOTHER FOOD OF SEMISOLID CONSISTENCY

CROSS-REFERENCE TO RELATED PATENT APPLICATIONS

The present application is a U.S. national stage application under 35 U.S.C. § 371 of PCT Application No. PCT/IB2020/050476, filed Jan. 22, 2020, which claims priority to No. Italian Patent Application 102019000001227, filed Jan. 28, 2019. The disclosures of the aforementioned priority applications are incorporated herein by reference in their entireties.

The present invention relates to an ice cream scoop or scoop for another food of semisolid consistency.

As it is known, three different types of utensils may generally be used to serve ice cream. A first utensil consists of a spatula with which a desired amount of ice cream is taken. The serving temperature of ice cream is generally about −12° C.; at this temperature, ice cream has a semisolid consistency which allows it to be easily penetrated by the spatula. However, the use of the spatula does not allow to standardize the portion of taken ice cream.

A second utensil consists of a cutting scoop, the so-called scooper. This utensil consists of a handle connected to a hemispherical bowl which, when moved inside the ice cream bulk, allows to collect and roll the ice cream inside the bowl itself until it forms an ice cream sphere with quite constant dimensions.

Finally, a third utensil consists of a bladed scoop which, in addition to the scooper described above, also comprises a curved blade which is operated by means of a lever located on the handle, for sliding on the inner surface of the bowl, so as to allow the ice cream sphere to detach.

The aforementioned scoopers, optionally with a blade, allow to take ice cream, by cutting it, even at temperatures below the normal serving ones (e.g., −16/−24° C.).

In the ice cream industry, the need to innovate and customise product offer and presentation modes for the final consumer is currently very much felt, concerning both ice cream in a cone, bowl, or cup, and ice cream served for takeaway or for table service. In fact, edible garnishes and/or so-called toppings consisting of liquid food preparations with a thick consistency are often used.

The aim of the present invention is to provide an ice cream scoop or scoop for another food of semisolid consistency which overcomes the limitations of the prior art, allowing the product presentation to the final consumer to be customised, both from a visual and organoleptic point of view.

Within the scope of this aim, an object of the present invention is to provide an ice cream scoop or scoop for another food of semisolid consistency which, when taking the same, may be used by the operator substantially in the same way as known scoops.

A further object of the invention is to provide a scoop which is capable of ensuring the greatest guarantees in terms of reliability, hygiene and safety in use.

Another object of the invention is to provide a scoop which is however easy to manufacture and use.

The aforementioned aim, well as the as aforementioned objects and others that will be better explained hereinafter, are achieved by an ice cream scoop or scoop for another food of semisolid consistency as recited in claim 1.

Other features are provided in the dependent claims.

Further features advantages will become apparent from the description of some preferred but non limiting embodiments of an ice cream scoop or scoop for another food of semisolid consistency, illustrated only by way of non-limiting examples by the accompanying drawings, wherein:

FIG. 1 is a schematic view of a first embodiment of an ice cream scoop or scoop for another food of semisolid consistency, according to the invention;

FIG. 2 is a schematic view of a variant of the scoop of FIG. 1;

Figure 3:
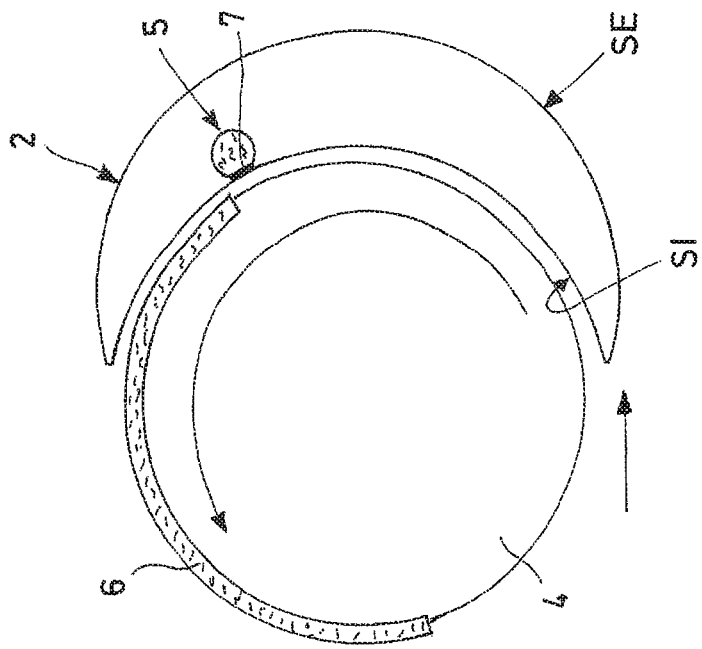
Figure 4:
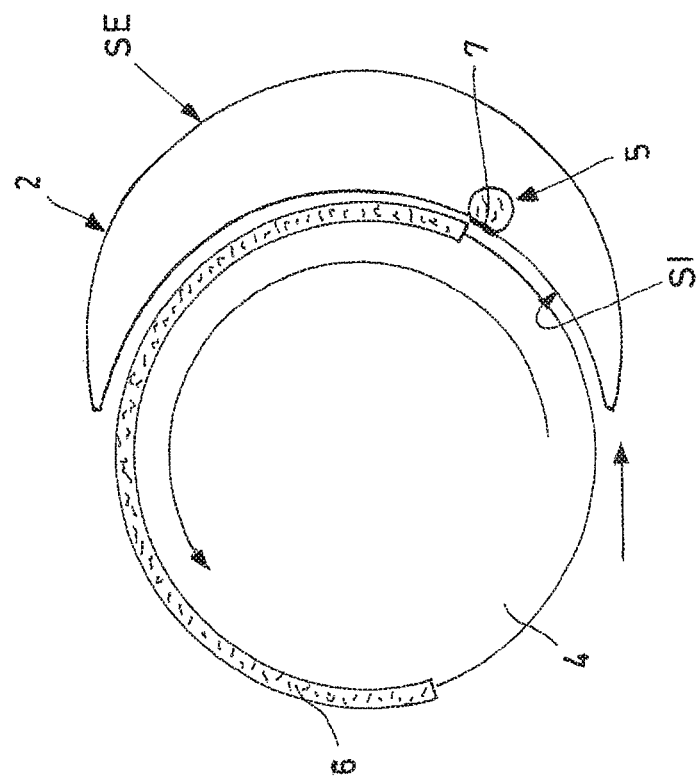
Figure 6:
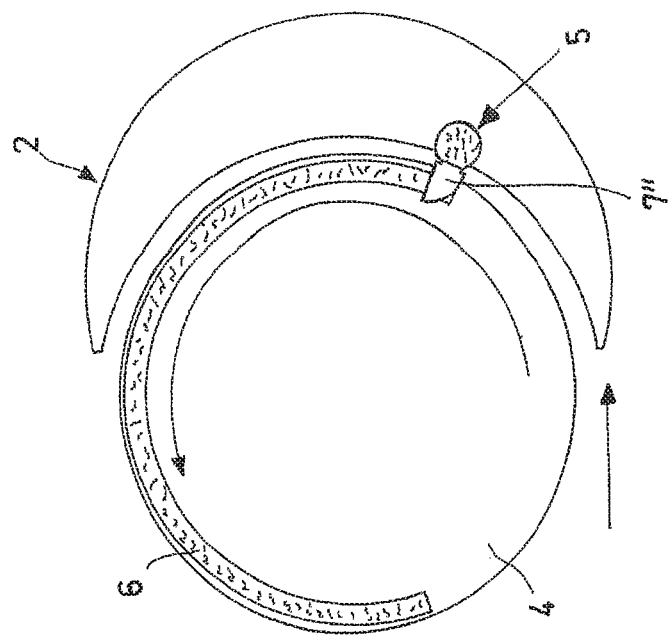
Figure 5:
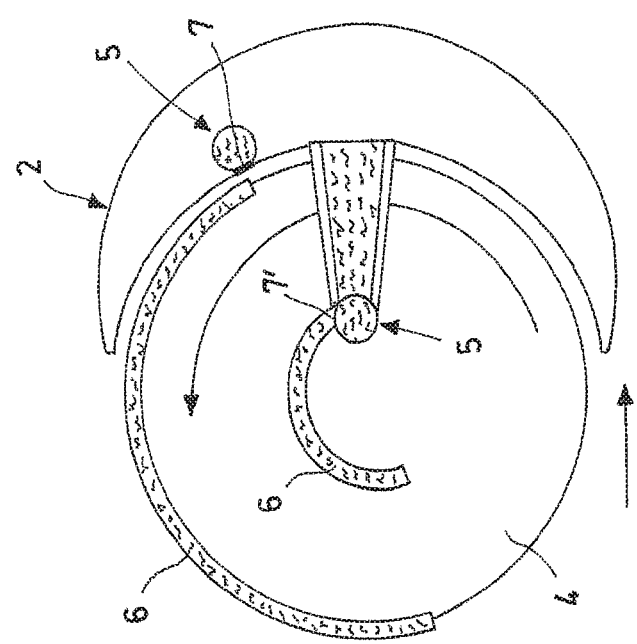
Figure 14:
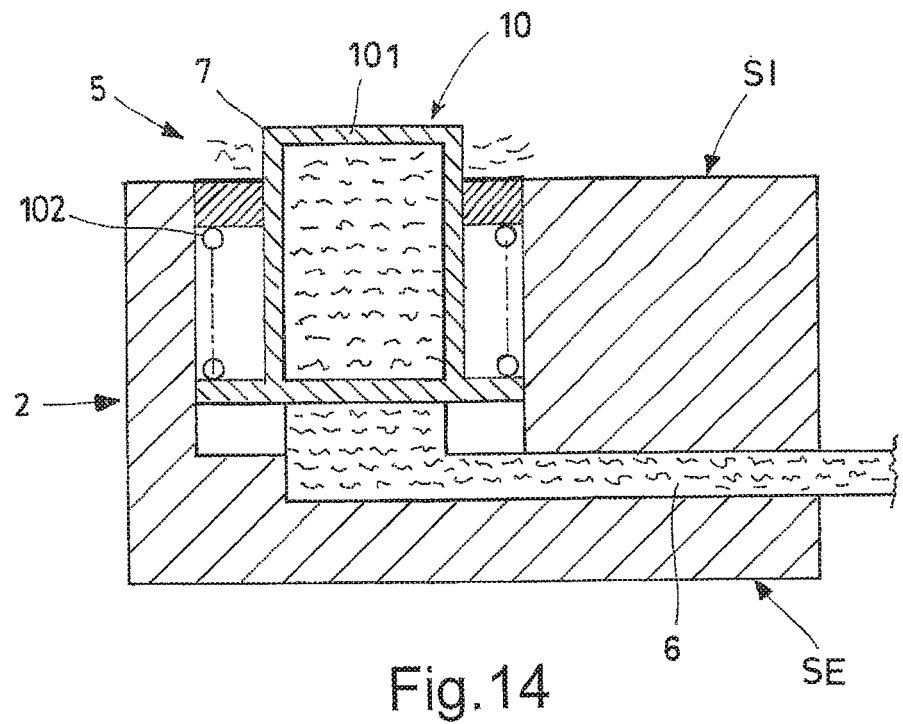
Figure 13:
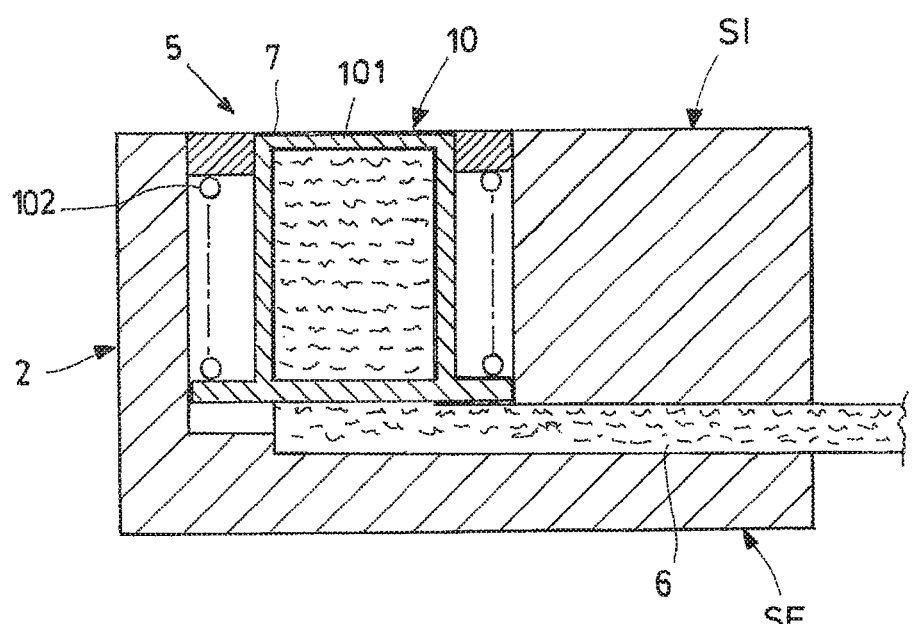
Figure 17A:
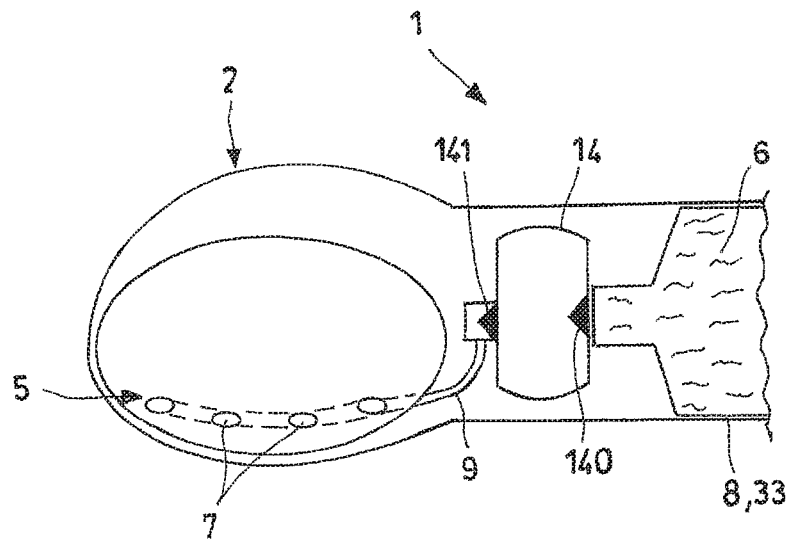
Figure 17B:
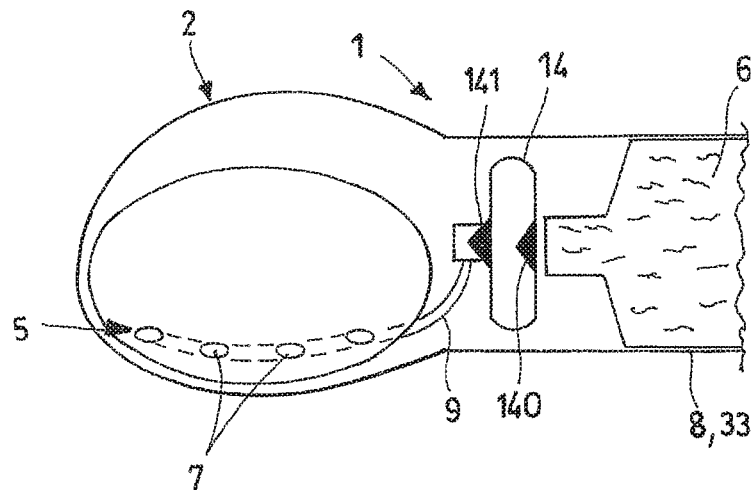
Figure 17C:
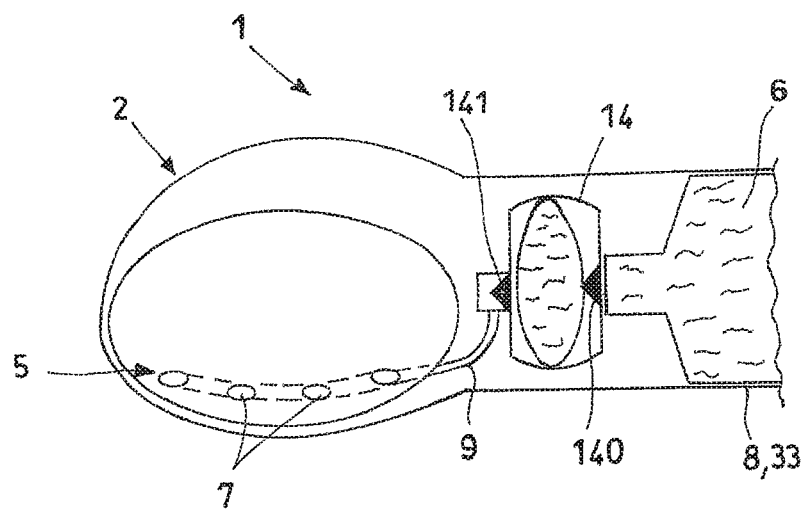
Figure 17D:
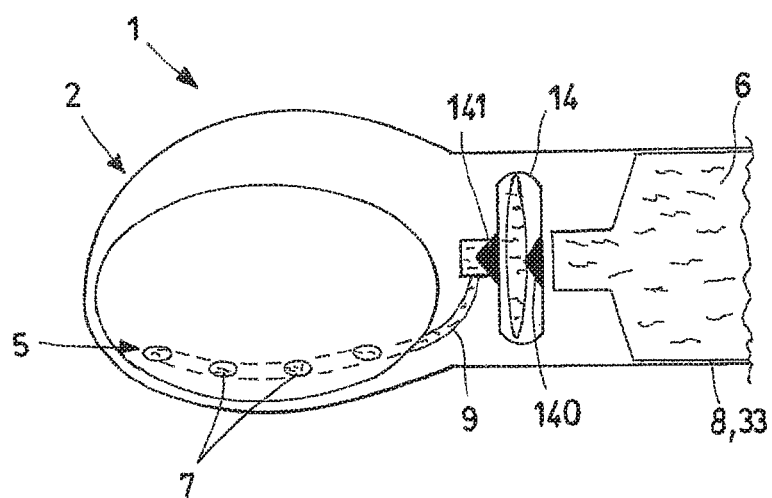
Figure 17E:
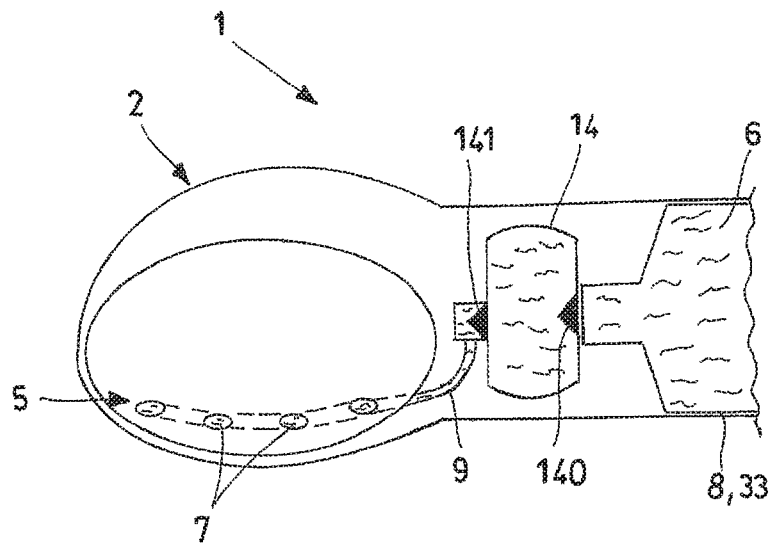
Figure 17F:
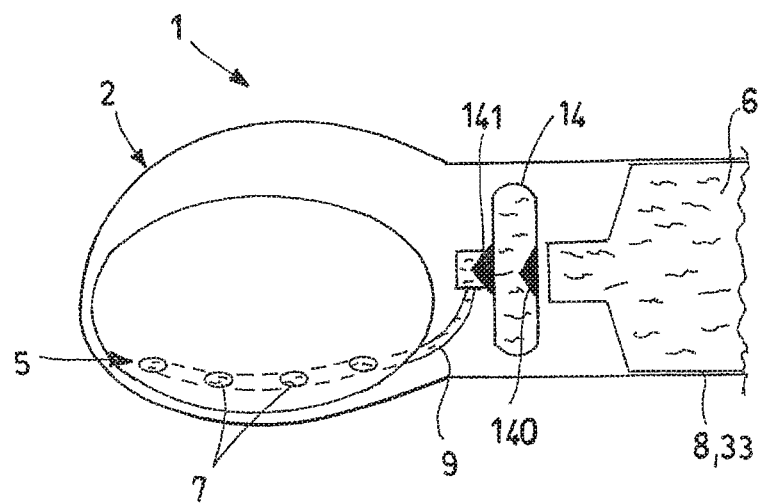
Figure 18:
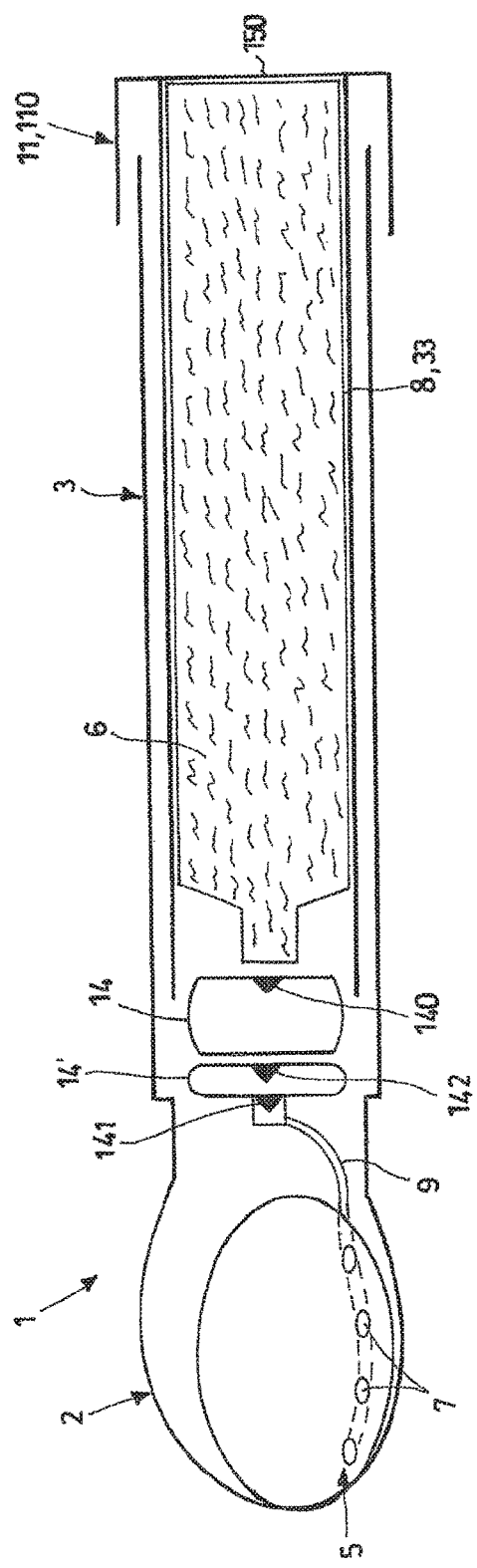
Figure 32:
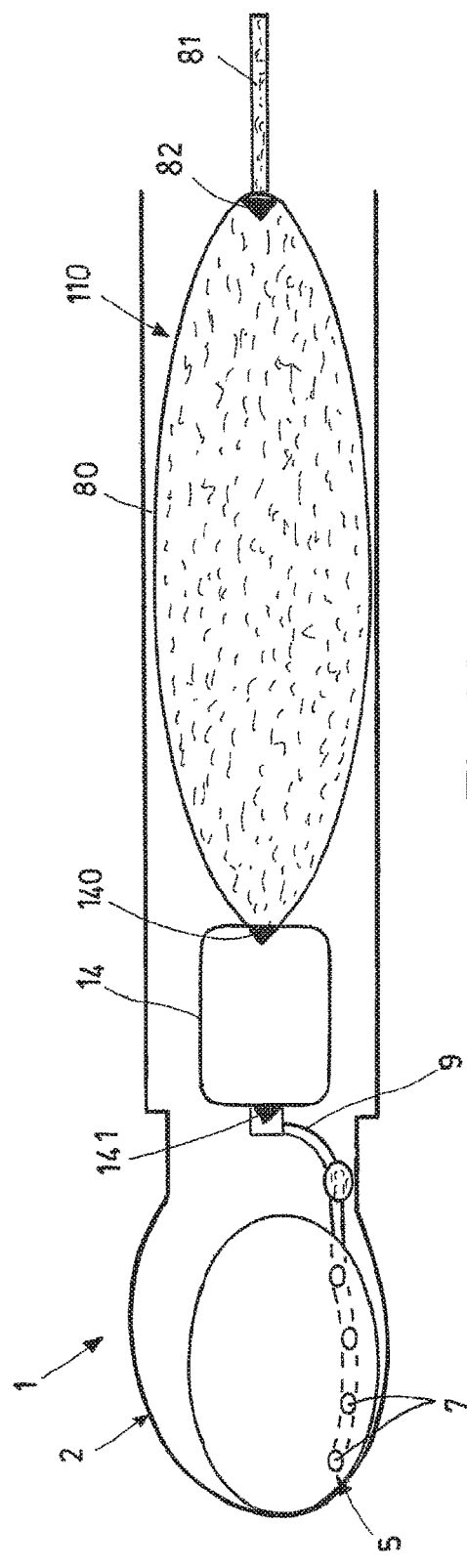
Figure 19:
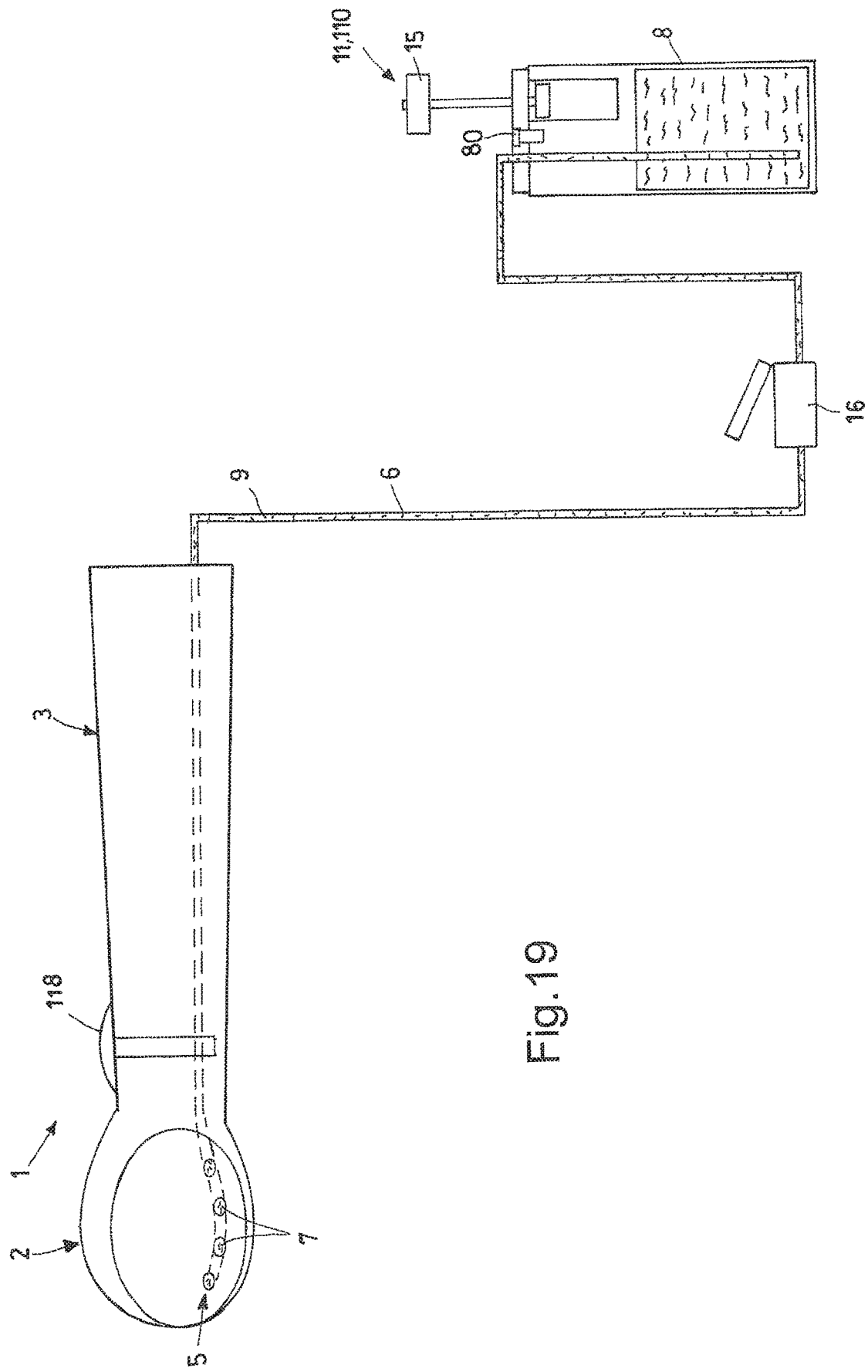
Figure 20:
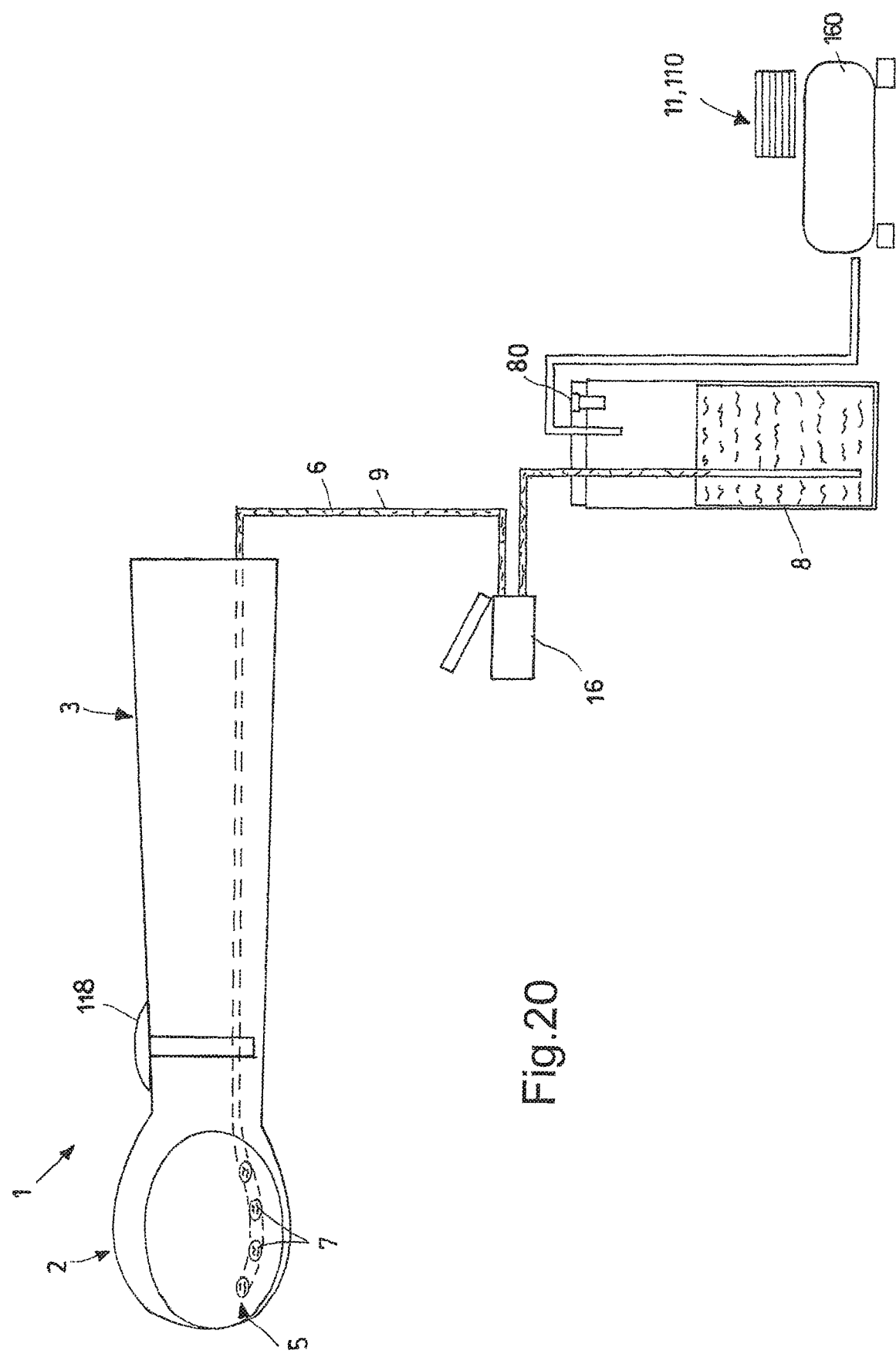
Figure 21:
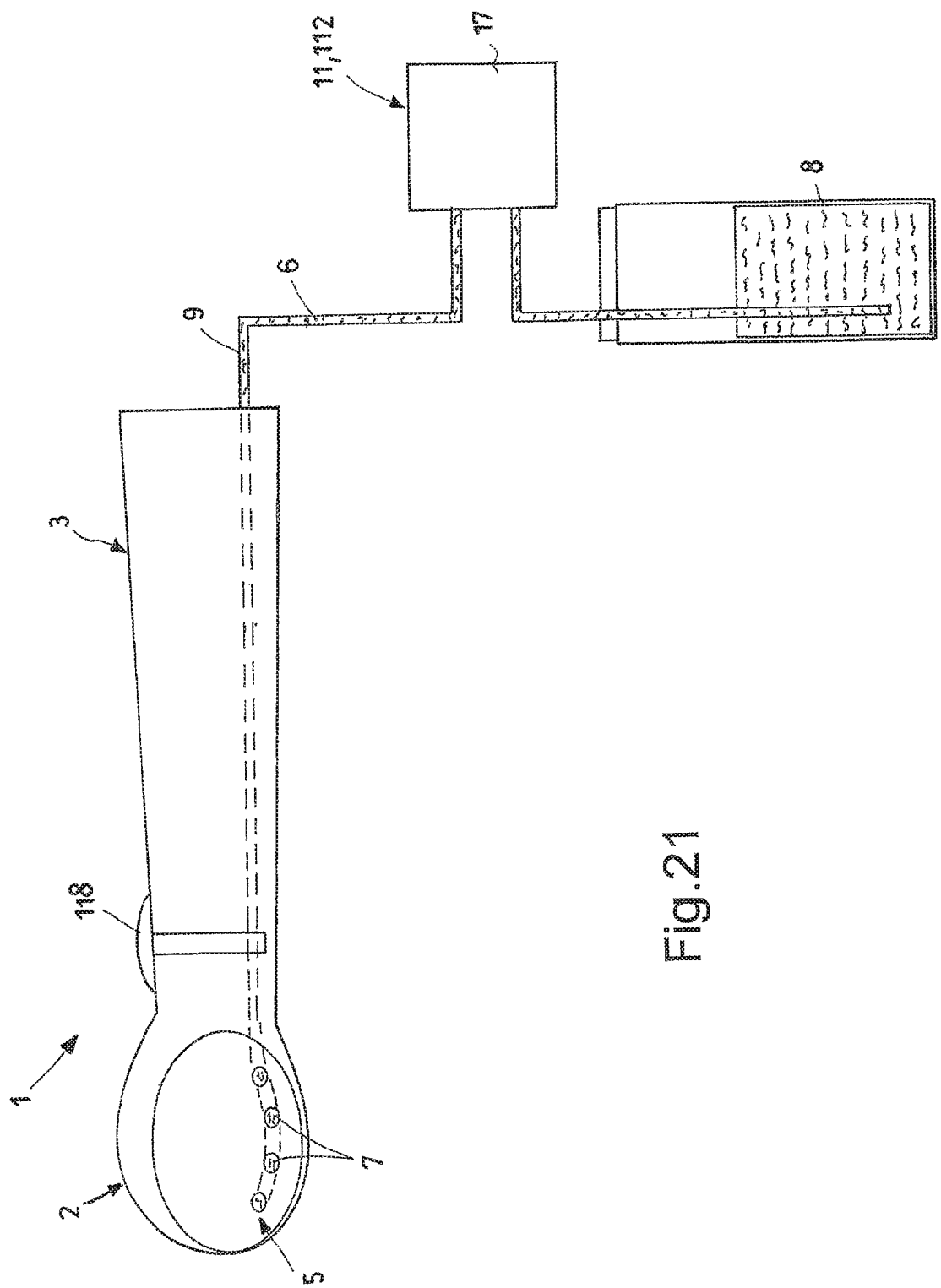
Figure 26:
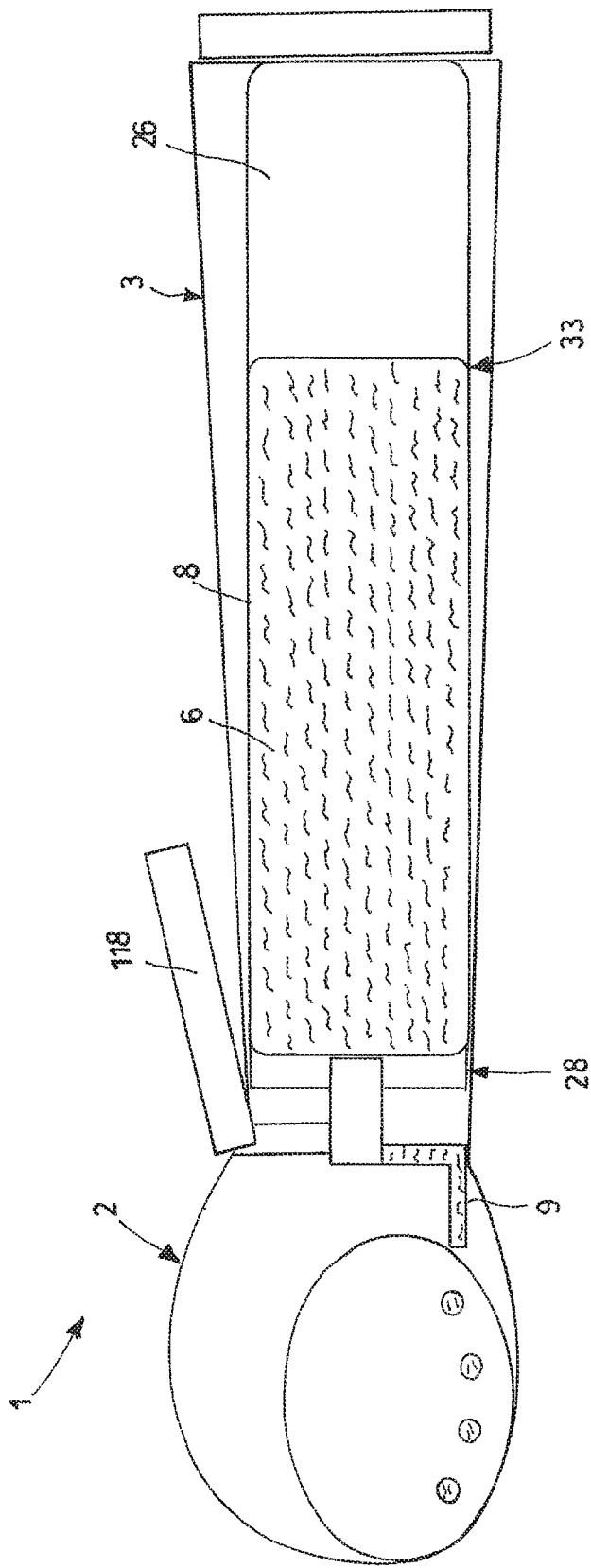
Figure 27B:
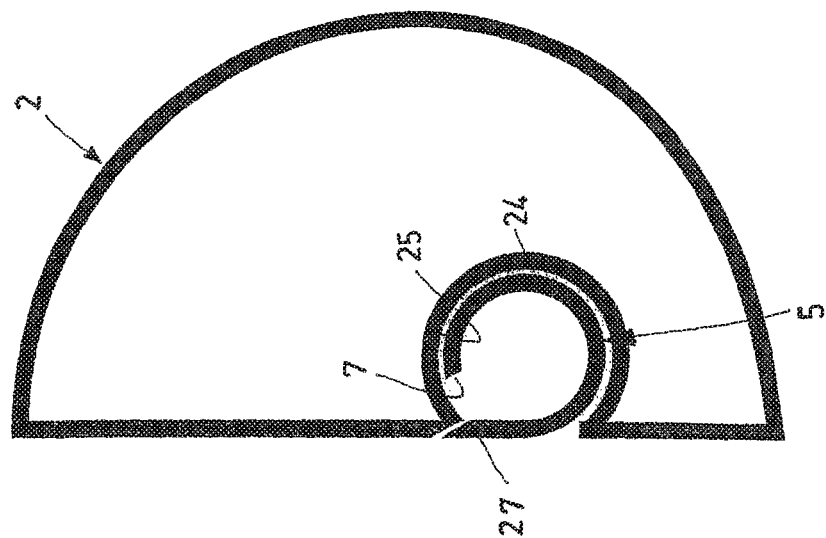
Figure 27A:
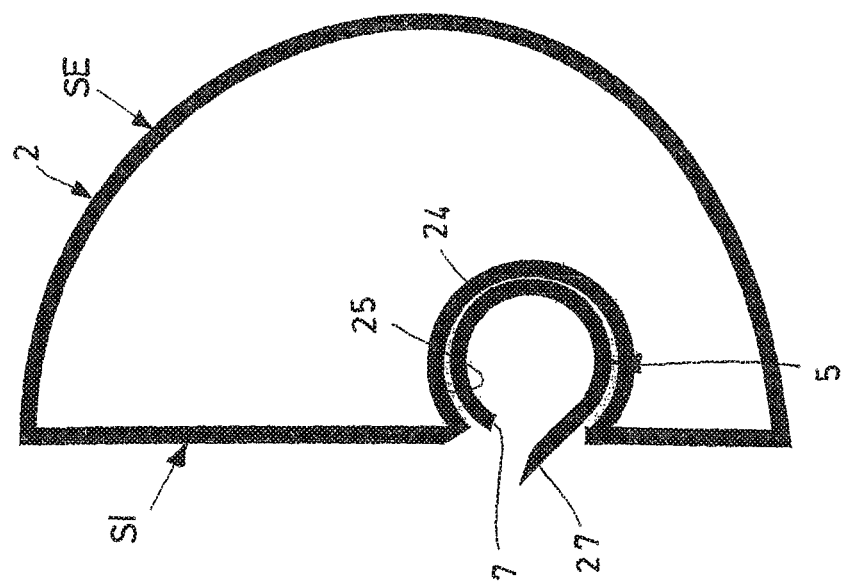
Figure 29A:
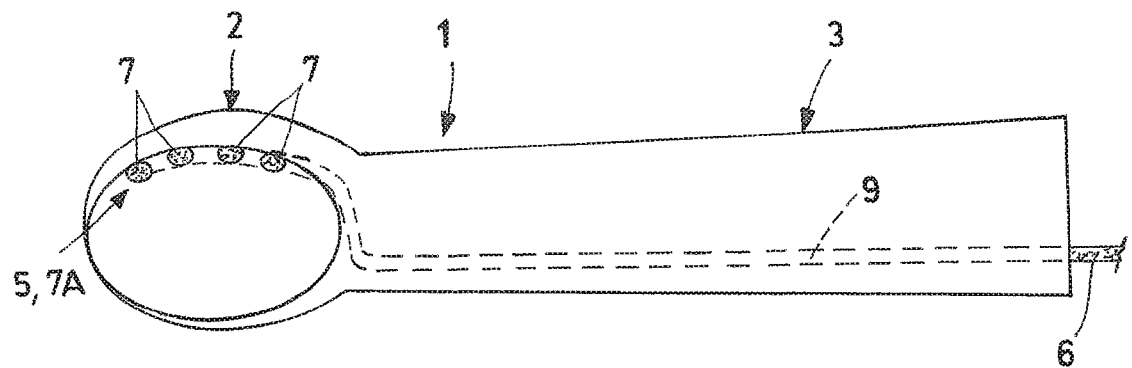
Figure 29B:
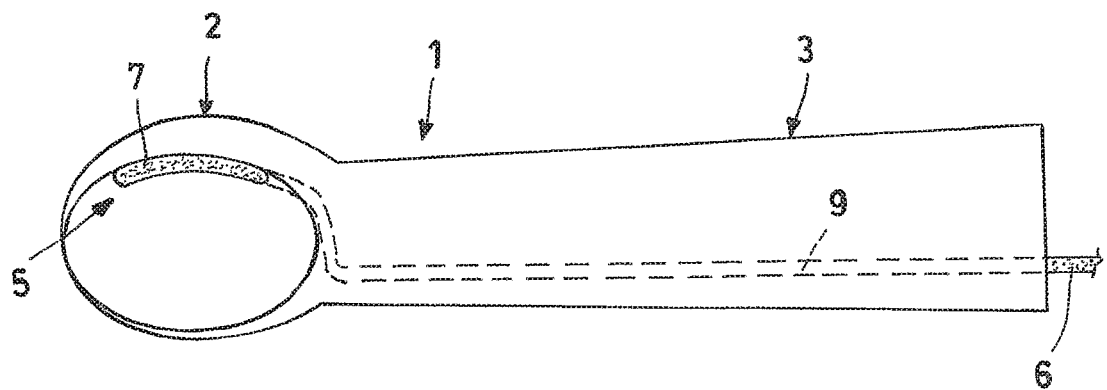
Figure 29C:
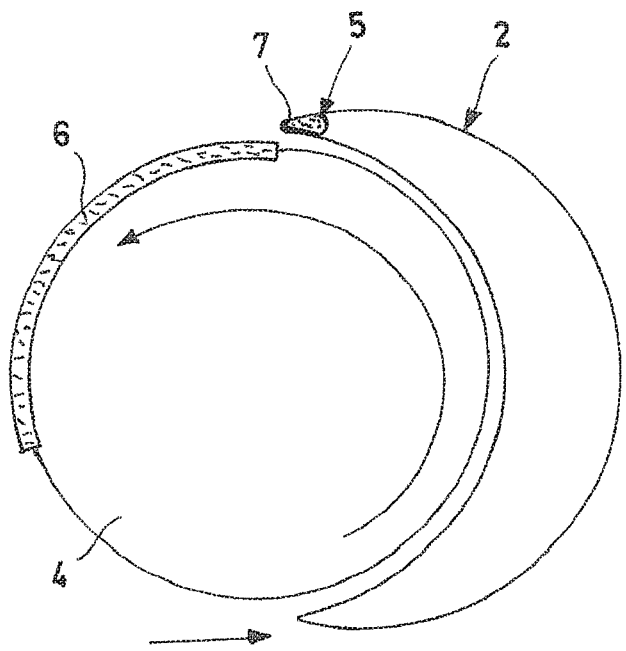
Figure 30A:
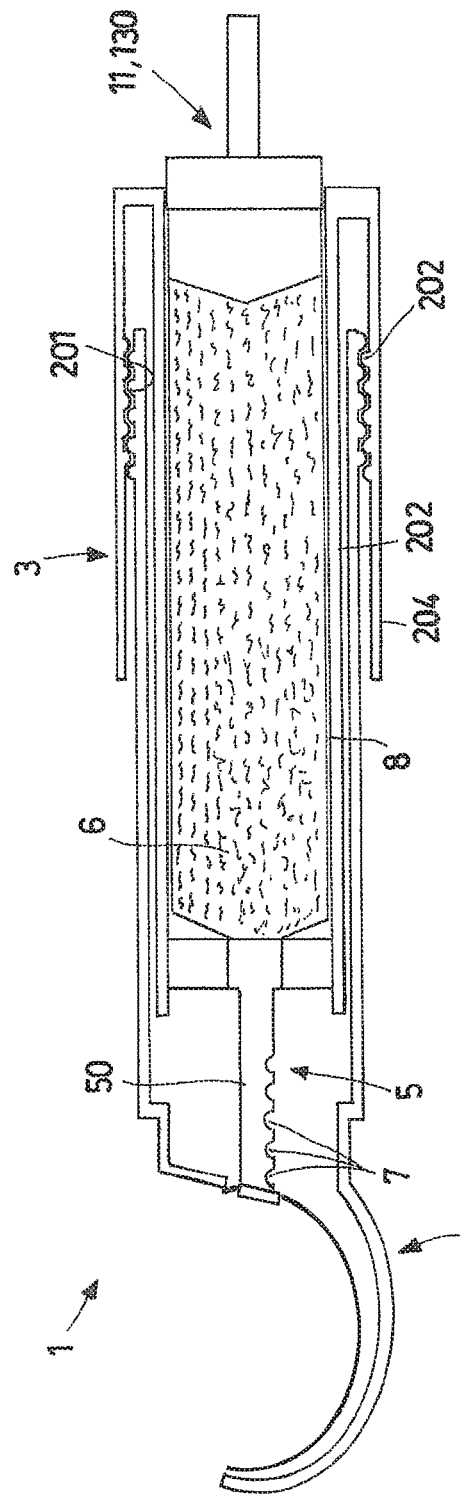
Figure 30B:
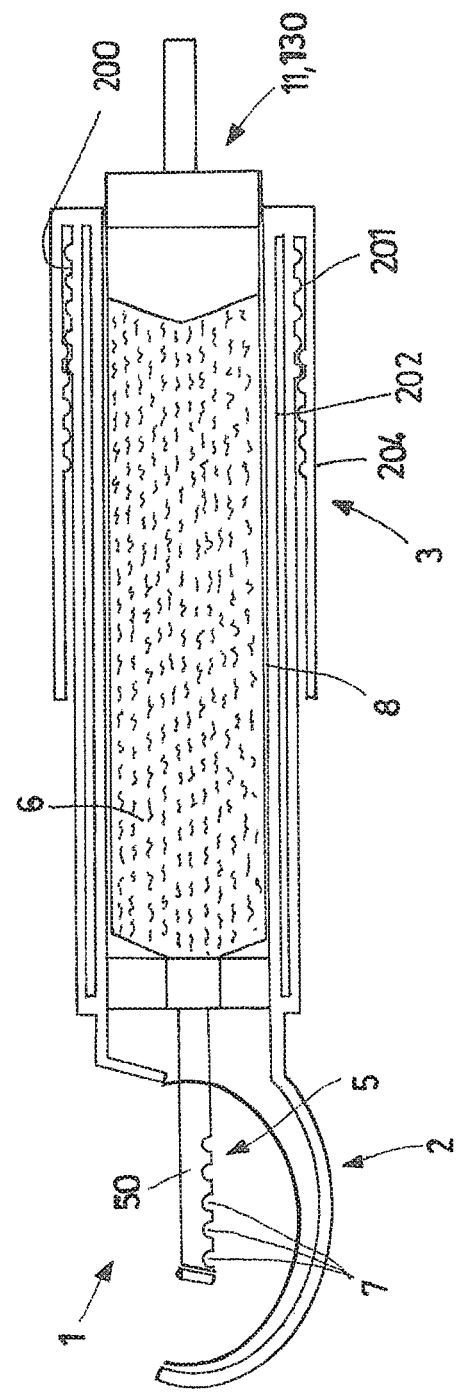

FIG. 3 schematically illustrates the bowl of the scoop of FIG. 1 during the formation of an ice cream sphere;

FIG. 4 schematically illustrates the bowl of the scoop of FIG. 2 during the formation of an ice cream sphere;

FIG. 5 and FIG. 6 schematically illustrate two variants of the bowl of the ice cream scoop according to the invention, during the formation of an ice cream sphere;

FIGS. 7 to 10 schematically illustrate further four variants of the scoop of FIG. 1, according to the invention;

FIGS. 11 and 12 schematically illustrate a nozzle with a silicone valve, respectively in a closed and open configuration, of the scoop according to the invention;

FIGS. 13 and 14 schematically illustrate a nozzle with a retractable valve, respectively in a closed and open configuration, of the scoop according to the invention;

FIG. 15 schematically illustrates a stand-alone ice cream scoop according to the invention, with a manual pressurizer;

FIG. 16 illustrates a variant of the scoop of FIG. 15;

FIGS. 17A to 17F schematically illustrate a part of the stand-alone ice cream scoop according to the invention, with a cartridge, at different steps of dispensing the food sauce;

FIG. 18 schematically illustrates a variant of the scoop represented in FIGS. 17A to 17F;

FIG. 19 schematically illustrates an ice cream scoop according to the invention, connected to a pressurized container provided with a manual pump;

FIG. 20 schematically illustrates an ice cream scoop according to the invention, connected to a pressurized container provided with an electric compressor;

FIG. 21 schematically illustrates an ice cream scoop according to the invention, connected to a container by means of a pump;

FIG. 22 schematically illustrates a dock station accommodating a plurality of ice cream scoops according to the invention;

FIG. 23 schematically illustrates an ice cream scoop according to the invention comprising a container and a pump inside the handle;

FIG. 24 schematically illustrates an ice cream scoop according to the invention, comprising an outer container and a pump inside the handle;

FIGS. 25A to 25F schematically illustrate a device for closing the dispensing nozzles present in the bowl of the ice cream scoop according to the invention, in front and side views, and in three different configurations of use;

FIG. 26 schematically illustrates a stand-alone ice cream scoop according to the invention, with a gas cartridge;

FIGS. 27A and 27B schematically illustrate a variant of the device for closing the dispensing nozzles illustrated in FIGS. 25A to 25F;

FIGS. 28A, 28B and 28C schematically illustrate a stand-alone ice cream scoop according to the invention, with a cartridge compressible by means of a telescopic screw;

FIG. 29A is a schematic view of a further variant of the scoop of FIG. 1;

FIG. 29B is a schematic view of yet another variant of the scoop of FIG. 1;

FIG. 29C schematically illustrates the bowl of the scoop of FIG. 29A (or 29B) during the formation of an ice cream sphere;

FIGS. 30A and 30B schematically illustrate an ice cream scoop according to the invention, with an extractable dispensing tube;

FIGS. 31A, 31B and 31C illustrate a variant of the scoop illustrated in FIGS. 30A and 30B, in a top view with an extractable dispensing tube being retracted, in a top view with an extractable dispensing tube being extracted, and in a bottom view with an extractable dispensing tube being extracted, respectively;

FIG. 32 illustrates a further variant of the scoop according to the invention.

With reference to the aforementioned figures, the ice cream scoop or scoop for another food of semisolid consistency, globally indicated with the reference number 1, comprises a bowl 2 or spatula and a handle 3 carrying said bowl 2 or spatula. The scoop 1 is adapted to make a portion 4 in the bowl 2 or spatula, preferably a spherical portion, of ice cream or other food when the bowl 2 or spatula is moved through a bulk of ice cream or other food.

According to the invention, the scoop 1 comprises dispensing means 5 of at least one food sauce 6 adapted to dispense said food sauce 6 on and/or within said ice cream or other food portion 4 during the formation of said ice cream or other food portion 4 in said bowl 2 or spatula.

The scoop 1 preferably comprises a bowl 2 adapted to make an ice cream or other food portion 4 substantially spherical in shape.

The scoop 1 alternatively comprises a spatula adapted to make an ice cream or other food portion having a less defined shape.

As illustrated for example in FIG. 3, when the bowl 2 is slid, with certain pressure, in contact with an ice cream bulk, an ice cream portion 4 is collected inside the bowl 2 which forms, by rolling along the inner surface of the bowl 2 itself, a so-called ice cream sphere 4. During the formation of the ice cream sphere 4 in the bowl 2, the dispensing means 5 of the food sauce 6 deposit the sauce itself on the outer surface of the ice cream sphere 4.

In fact, whilst the ice cream rolls inside the bowl 2, the food sauce 6 dispensed by the dispensing means 5 is spread on the surface of the ice cream sphere 4 which forms in the bowl 2 itself.

Advantageously, the dispensing means 5 of the food sauce 6 comprise at least one dispensing nozzle 7 connected, through a conduit 9, to at least one container 8 containing said food sauce 6.

In the simplest embodiment, the dispensing nozzle 7 is defined by an opening which allows said food sauce 6 to come out.

Advantageously, the at least one dispensing nozzle 7 is obtained in the vicinity of a substantially median area of the inner surface SI of the bowl 2, with respect to the direction L of longitudinal development of the handle 3. The food sauce 6 thus comes out of the bottom surface of the bowl 2, reaching the ice cream portion 4 at a central area thereof.

The positioning of the dispensing nozzles 7 at least in an area close to the midline M is important for the correct distribution of food sauce 6 in and/or on the ice cream portion 4 which is formed during the movement of the bowl 2 inside the ice cream bulk.

For example, in FIGS. 1 and 2, it can be noted that at least one of the central nozzles 7 is obtained in the vicinity of the midline M of the bowl 2, with line M being perpendicular to the longitudinal direction L.

Advantageously, the conduit 9 is at least partially obtained in the thickness of the bowl 2 (or spatula) between the outer surface SE and the inner surface SI of the bowl 2.

Advantageously, the scoop 1 may be used for ice cream, but also for other food of semisolid consistency such as soft cheese.

Advantageously, the food sauce 6 is a semithick liquid topping for ice cream. Such food sauce 6 may be advantageously selected from the group consisting of: thick syrup, melted chocolate, Nutella, cream.

Advantageously, the food sauce 6 may also comprise solid foods in granular form, such as grains or flakes.

As illustrated in FIGS. 1 and 3, the dispensing nozzles 7 may be placed in the lower part of the bowl 2, that is, in the part of the bowl 2 which is intended to contact the ice cream first. This position allows a more complete dispensing of the food sauce 6 on the outer surface of the ice cream sphere 4. However, in a subsequent operation, residues of food sauce present in the lower part of bowl 2 may smear the ice cream present in the tray from which it is taken.

As illustrated in FIGS. 2 and 4, the dispensing nozzles 7 may be placed in the upper part of the bowl 2, that is, in the part of the bowl 2 which contacts the ice cream following the lower part. Such position reduces the risk of smearing the ice cream present in the tray from which it is taken, ensuring that the food sauce 6 only contacts the ice cream sphere 4.

As illustrated in FIGS. 29A, 29B and 29C, the at least one dispensing nozzle 7 may be placed right at the upper limit of the bowl 2, i.e. precisely in the area of the bowl 2 wherein the freshly formed ice cream portion 4 comes out of the scoop 1.

As illustrated in FIG. 29B, a plurality of dispensing nozzles 7 distributed on the upper curve of the bowl 2 may be present.

Alternatively, as illustrated in FIG. 29C, a single nozzle 7 defined by a slot extending on the upper curve of the bowl 2 may be present.

The dispensing nozzles 7 may be arranged flush with the inner surface of the bowl 2, as illustrated in FIGS. 3 and 4 and 29A.

Advantageously, as illustrated in FIG. 5, dispensing nozzles I' may also be present which protrude towards the inside of the concave part of the bowl 2, so as to dispense the food sauce inside the ice cream swirl being formed, with the food sauce 6 also being dispensed inside the ice cream sphere 4.

Advantageously, as illustrated in FIG. 6, the dispensing nozzles I" may slightly protrude from the inner surface of the bowl 2, so as to create a small circular groove on the outer surface of the ice cream sphere 4, while this is being formed. In this way, the food sauce 6 is dispensed inside such groove with greater precision.

The dispensing nozzles 7 may have a circular cross-section, or an oval cross-section, of a different size depending on the type of food sauce 6 to be dispensed and depending on the optional presence of solid food in granular form.

Advantageously, the dispensing means 5 comprise one or more containers 8. Furthermore, the dispensing means 5 comprise a plurality of sets 7A, 7B, 7C, 7D, 7E of dispensing nozzles 7 distributed on the inner surface of said bowl 2 or spatula, where each one of said sets 7A, 7B, 7C, 7D, 7E of dispensing nozzles 7 is connected through a conduit 9 to said one or more containers 8.

Advantageously, as illustrated in FIGS. 1 and 2, the dispensing means 5 comprise a set 7A of dispensing nozzles 7 distributed on the inner surface of the bowl 2 and connected, through a conduit 9, to the same container 8, for dispensing the food sauce 6 present in such container 8.

Advantageously, a plurality of containers 8 may be present, each containing a different food sauce 6.

Figure 7:
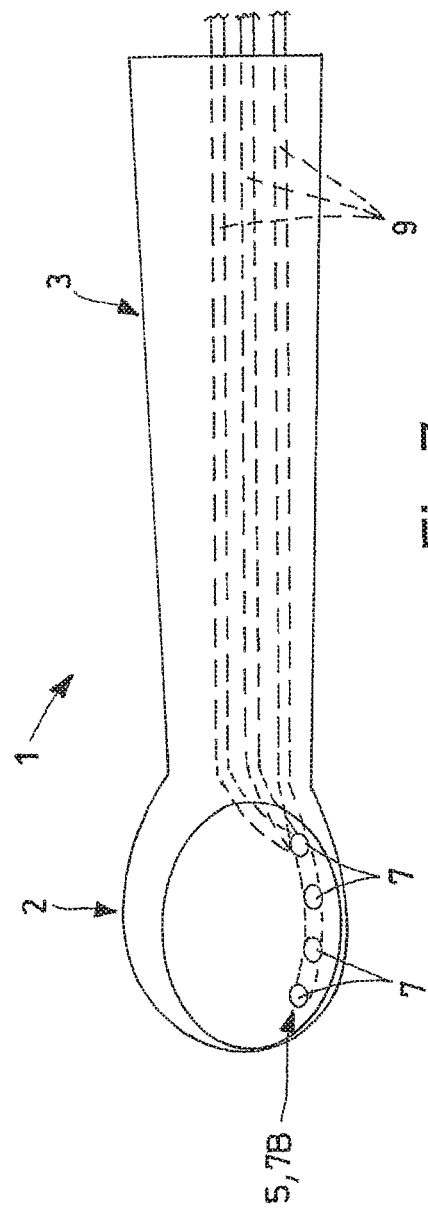

As illustrated in FIG. 7, the dispensing means 5 may comprise a set 7B of dispensing nozzles 7 distributed on the inner surface of the bowl 2 and all connected, through a plurality of conduits 9, to said plurality of containers 8. In this way, a different type of food sauce 6 to be dispensed may be selected at each operation. The different food sauce 6 shall always be dispensed by the same dispensing nozzles 7 belonging to the set 7B.

Figure 8:
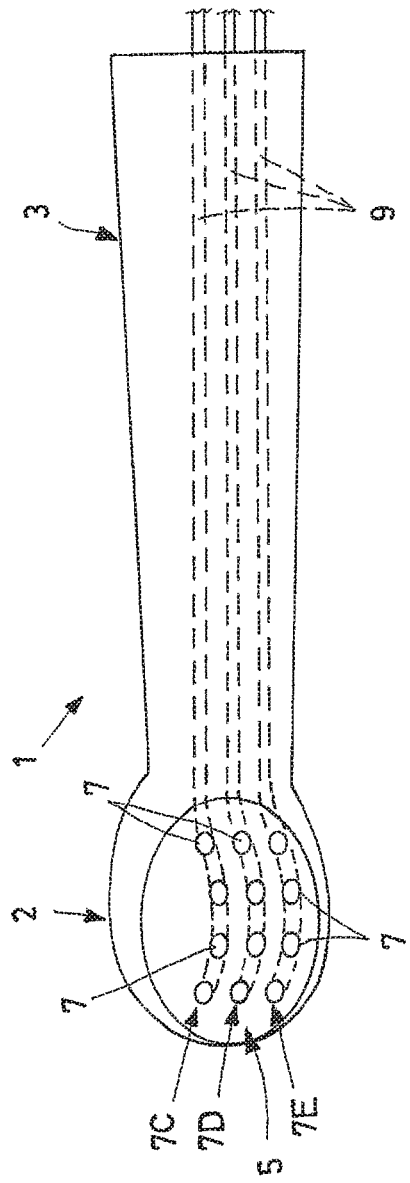

As illustrated in FIG. 8, the dispensing means 5 may comprise a plurality of sets 7C, 7D, 7E of dispensing nozzles 7 distributed on the inner surface of the bowl 2, where each one of sets 7C, 7D, 7E of dispensing nozzles 7 is connected through a conduit 9 to a respective container 8 of such plurality of containers 8. In this way, different types of food sauce 6 may be dispensed at the same time during the formation of the ice cream sphere 4. In this case, each set 7C, 7D, 7E of dispensing nozzles 7 is designed to dispense a different food sauce 6 from a different container 8.

Advantageously, as illustrated in FIGS. 9 and 10, rinsing means 12 of the scoop 1 may also be provided.

As illustrated in FIG. 9, the rinsing means 12 may comprise a rinsing liquid dispensing nozzle 120 connected, through a conduit 121, to a container containing rinsing liquid. In this way, the bowl 2 may be rinsed after use. The rinsing liquid may, for example, be water optionally added with detergents.

As illustrated in FIG. 10, the rinsing means 12 may comprise a connector 122 connected, through a conduit 123, to a container containing rinsing liquid. Such connector 122 allows the rinsing liquid to be introduced directly into the conduits 9 for feeding the food sauce 6 to the nozzles 7, in order to directly rinse the nozzles 7 themselves from the inside.

Advantageously each dispensing nozzle 7 may be provided with a dispensing valve 10 which may be activated to allow the dispensing of the food sauce 6. The use of dispensing valves 10 allows to avoid dripping of the food sauce 6, once the dispensing is finished.

Advantageously, the dispensing valves 10 are of the retractable type.

Such dispensing valve 10 may, for example, open when the food sauce 6 is pressurized, as explained below, or open following an activation command.

FIGS. 11 and 12 illustrate an exemplary dispensing valve 10 consisting of a flexible, elastic silicone element 100, suitable for opening to allow the food sauce 6 to come out when the same is pushed in a pressurized state and to return to its closing position when the pressure ceases, or, for example when using pumps, as explained hereinafter, when the pump is momentarily activated in the opposite direction to suck back the food sauce 6 and consequently also the silicone element 100.

FIGS. 13 and 14 illustrate a dispensing valve 10 comprising a moving element 101 which may move from a closing position, illustrated in FIG. 13, wherein it is inserted inside the body of the bowl 2, to an opening position, illustrated in FIG. 14, wherein it comes out at least partially with respect to the body of the bowl 2 to allow the food sauce 6 to come out through the dispensing nozzle 7. The opening and closing movement of the moving element 101 is advantageously caused by the pressure imparted on the food sauce 6: an increase in pressure of the food sauce 6 causes the moving element 101 to rise and the valve 10 to open, while a decrease in pressure of the food sauce 6 draws the moving element 101 to the closing position. Also in this case, if a pump is present, it may be activated in the opposite direction to cause the food sauce 6 to be sucked back and the valve 10 to return to the closing position.

Advantageously, a spring 102 configured to keep the moving element 101 in a closed position may also be present. The pressure generated by the food sauce 6 causes the opening of the valve 10, which is returned to the closed position by the spring 102 when such pressure ceases.

Advantageously, the dispensing means 5 of the food sauce 6 comprise motion means 11 of the food sauce 6 suitable for pushing the food sauce 6 from the container 8 to the dispensing nozzles 7, along the conduits 9.

Advantageously, such motion means 11 may be selected from the group consisting of:

- pressurization means 110 adapted to press the food sauce 6 contained in the container 8;
- pumping means 112 adapted to pump the food sauce 6 from the container 8 to the dispensing nozzles 7;
- suction means adapted to suck the food sauce 6 from the container 8;
- screw pushing means adapted to take the food sauce 6 from the container 8 to push the same towards the dispensing nozzles 7;
- compression means 130 adapted to squeeze the food sauce 6 contained in the container 8 towards the dispensing nozzles 7.

The screw pushing means are advantageously adapted to operate the movement of food sauce comprising grains or flakes, or exclusively consisting of grains or flakes.

Advantageously, the motion means 11 may be housed in the handle 3 of the scoop 1.

Advantageously, the container 8 of food sauce 6 is housed in the handle 3 of the scoop 1.

Advantageously, therefore, both the motion means 11 of the food sauce 6 and the container 8 may be housed in the handle 3.

FIGS. 15 and 16 illustrate a stand-alone scoop 1 with a manual pressurizer. Such scoop 1 houses inside its handle 3 both the container 8 of food sauce 6 and the motion means 11, and more particularly the manual pressurization means 110.

The scoop 1 of FIG. 15 comprises an air container 113 separated from the container 8 of food sauce 6.

The pressurization means 110 comprise a pressurization plunger 114 associated with a valve 115, preferably an umbrella valve, and manually operable from the outside of the scoop 1, by means of a handle 124 to pressurize the air contained in the container 113. The air container 113 is in communication, through a valve 116, with the container 8 of food sauce 6, so that the increase in pressure of the air present in the container 113 is transmitted to the container 8 in order to press the food sauce 6 contained therein. The scoop 1 further comprises a dispensing button 118 which, once pressed, allows the food sauce 6 to flow along the conduit 9 to reach the dispensing nozzles 7. Such dispensing button 118 also advantageously serves as a controller of the amount of food sauce 6 dispensed.

Advantageously, such scoop 1 also comprises a safety pressure switch valve 117.

The container 8 of food sauce 6 may be advantageously filled when necessary, thanks to the presence of an opening towards the outside of the scoop 1, being closed in use by a special plug 13.

The scoop 1 of FIG. 16 differs from the scoop 1 of FIG. 15 in that it does not have a single container 8 of food sauce 6 and compressed air. In this case, the pressurization means 110 directly pressurize the air contained in the container 8 and a second valve 125, preferably an umbrella valve, is provided in addition to the valve 115.

FIGS. 17 and 18 illustrate a scoop 1 wherein the container 8 of food sauce 6 consists of a pressurized or pressurizable cartridge 33, also optionally being operated by suction.

As better described below, such cartridge 33 may be inserted in the vicinity of the bowl 2 of the scoop 1 through a suitable coupling device, for example of the bayonet type.

Advantageously, the cartridge 33 is communicated with an expansion chamber 14 made from silicone or other flexible, elastic material, by means of a first check valve 140. Such expansion chamber 14 is further connected, by means of a second check valve 141, to the conduit 9 which takes the food sauce 6 to the dispensing nozzles 7.

The sequence of FIGS. 17A to 17F illustrates the operation of such scoop 1. Compression of the expansion chamber 14 causes the air contained therein to come out (FIG. 17B). The return of the expansion chamber 14 to the starting configuration causes the food sauce 6 to be sucked from the cartridge 13 to the expansion chamber 4 (FIG. 17C). A subsequent compression of the expansion chamber 14 causes the food sauce 6 to be dispensed from the nozzles 7 (FIG. 17D). The subsequent return of the expansion chamber 14 to the starting configuration causes the food sauce 6 to be further sucked from the cartridge 33 to the expansion chamber 4 (FIG. 17E) to thus operate a subsequent dispensing (FIG. 17F), and so on.

Advantageously, as illustrated in FIG. 18, a second expansion chamber 14' may be present, also equipped with a check valve 142. The presence of the second expansion chamber 14' allows a more constant and prolonged dispensing of the food sauce 6, since the second expansion chamber 14' is more constantly filled by the first expansion chamber 14.

FIG. 18 also illustrates an example of how the pressurization means 110 may be made by using a particular configuration of the handle 3. In fact, the pressurization means 110 are defined by a moving end 150 of the handles 3, which may be moved by hand to compress the expansion chamber (s) 14,14'.

In a variant of the scoop 1 illustrated in FIG. 32, the pressurization means 110 are defined by a container 8 having at least partially compressible, elastic walls 80. Compression of the walls 80 of the container 8 causes the food sauce to be sucked inside the same, through a conduit 81, by means of a further check valve 82, and subsequently the expansion chamber 14 made from silicone or other flexible, elastic material to be filled, by means of the first check valve 140. Advantageously, the container 8 may be connected, through the conduit 81, to means for feeding the food sauce, such as for example a further feeding container.

In an alternative not illustrated in the accompanying figures, the pressurization means 110 may comprise lever means which are pressed to compress the expansion chamber (s) 14,14'.

FIGS. 19, 20 and 21 illustrate scoops 1 with an outer container 8 of food sauce 6.

In the embodiment of the scoop 1 illustrated in FIG. 19, the pressurization means 110 consist of a manual pump 15 suitable for pressurizing the container 8.

Advantageously, a pedal 16 may be provided which allows the food sauce 6 to pass from the container 8, along the conduit 9, to the dispensing nozzles 7. The dispensing button 118 may allow a further adjustment of the dispensing of food sauce 6 from the nozzles 7.

Advantageously, the container 8 may be refilled when necessary by removing the closing plug 80.

In the embodiment of the scoop 1 illustrated in FIG. 20, the pressurization means 110 consist of a compressor 160 suitable for pressurizing the container 8.

In the embodiment of the scoop 1 illustrated in FIG. 21, pumping means 112 consisting of a pump 17 are provided. Such pump 17 may be a peristaltic pump, a lobe pump or a diaphragm pump or yet still a piezoelectric pump.

FIG. 22 illustrates a dock station 18 which may be equipped with a plurality of scoops 1.

The scoops 1 suitable for use in the dock station 18 advantageously have a container 8 for food sauce 6 inside the handle 3 and a compressed air container 19 which constitutes the pressurization means 110.

Such dock station 18 comprises a base 180 provided with a plurality of housings 181 for the scoops 1.

The insertion of the scoop 1 in a respective housing 1 allows to refill the container 8 with food sauce 6 and to refill the compressed air container 19 with compressed air at the same time.

Each housing 181 is advantageously connected to a different feeding line 182A, 182B, 182C, 182D of food sauce 6, and to a common compressed air line 183, powered by a compressor 20. The insertion of the scoop 1 inside the housing 1 therefore allows both to refill the container 8 with food sauce 6 coming from further containers, not illustrated, and to refill the compressed air container 19 with compressed air generated by the compressor 20.

Alternatively, the scoop 1 may comprise a single container 8 containing both the food sauce 6 and compressed air. The pressurized insertion of the food sauce 6 into the container 8 inside the scoop 1 is such as to allow, when necessary, the subsequent dispensing of food sauce 6 from the dispensing nozzles 7.

In the embodiments of the scoop 1 illustrated in FIGS. 23 and 24, a pump 21 is housed in the handle 3 which constitutes the pumping means 112. Such pump 21 is advantageously powered by the electric mains supply, through an electric power cable 22, or may be powered by batteries which are also contained inside the handle 3.

As illustrated in the aforementioned two figures, the container 8 may also be housed inside the handle 3 (FIG. 23), or external thereto (FIG. 24).

The pump 21 may advantageously be a peristaltic pump, or a piezoelectric pump.

FIGS. 25A to 25F illustrate the operation of a mechanism 23 for opening and closing the dispensing nozzles 7. The dispensing nozzles 7 are obtained in a dispensing cylinder 24 rotating around its central axis inside a seat 25 obtained in the bowl 2. The rotation of such dispensing cylinder 24, for example by means of a small lever 26, allows to displace the dispensing nozzles 7 from an opening position, wherein they face towards the inner surface of the bowl 2 (FIGS. 25A and 25B), to a closing position, wherein they face towards the inside of the seat 25 (FIGS. 25E and 25F), preventing dispensing the food sauce 6.

The rotation of the dispensing cylinder 24 may also allow to take advantage of the possibility of inserting a shut-off that prevents the pressurized food sauce 6 from coming out, for example in the case of a stand alone scoop 1.

When the dispensing cylinder 24 is in the closed position, the scoop 1 may be used exactly as a regular scoop 1 of the standard type.

FIGS. 27A and 27B illustrate a variant of the mechanism 23 for opening and closing the dispensing nozzles 7 described above.

According to such variant, the dispensing cylinder 24 comprises one or more elements 27 radially protruding with respect to the lateral surface of the dispensing cylinder 24 itself, configured to obtain, in said opening position of said dispensing nozzles 7, one or more grooves in the ice cream or other food portion 4 taken from the bowl 2.

As illustrated in FIGS. 27A and 27B, in the closing position of the dispensing nozzles 7 the radially protruding elements 27 remain flush with the inner surface of the bowl 2, while in the opening position, the rotation of the rotating cylinder 25 inside its seat 25 causes them to protrude with respect to the inner surface of the bowl 2.

When the scoop 1 is used to take ice cream, such radially protruding elements 27 create a groove in the ice cream sphere being formed, whether the dispensing nozzles 7 are dispensing or not dispensing the food sauce 6.

FIG. 26 illustrates a scoop 1 comprising, inside the handle 3, a pressurized cartridge 33 containing food sauce 6 and pressurized gas 26. Such scoop 1 also comprises a dispensing button 118 which may be operated for dispensing the food sauce 6. Such pressurized cartridge 33 may be advantageously replaced once emptied.

Advantageously, the cartridge 33 comprises a coupling device 28, for coupling to the scoop 1 having a particular proprietary design, in order to ensure that only cartridges 33 having a specific design of the coupling device 28 and therefore of the original type may be coupled to the respective scoop 1.

For example, the coupling device 28 of the cartridge 33 may comprise a bayonet coupling mechanism having a particular proprietary design to prevent the original cartridges to be counterfeited.

Advantageously, inside the concave part of the bowl 2, at the dispensing nozzles 7, channels of various shapes may be obtained, suitable for collecting the food sauce 6 so as to create streaks of various shapes on the ice cream sphere 4.

Advantageously, in a particularly simplified embodiment of the scoop 1, the motion means 11 of food sauce 6 may be absent. In this case, it is the sliding motion of the ice cream at the dispensing nozzles 7, of the open type, that takes, by contact, a certain amount of food sauce 6 which faces towards the inner surface of the bowl 2 itself and draws it onto the surface of the ice cream sphere 4 being formed in the bowl 2.

As illustrated in FIGS. 28A, 28B and 28C, the motion means 11 may comprise compression means 130 suitable for "squeezing" the food sauce 6 contained in the container 8.

Such compression means 130 may comprise a piston 131 axially movable by means of a telescopic screw 132 which may be actuated by means of a rotating ring nut 133 located on the body of the scoop 1.

Advantageously, between the piston 131 and the telescopic screw 132, a spring 134 may be interposed which has the function of making the dispensing of the food sauce 6 more constant during the manual rotation of the rotating ring nut 133 and the consequent extension of the telescopic screw 132.

FIGS. 28A, 28B and 28C sequentially illustrate the step of dispensing the food sauce 6. In FIG. 28A, the telescopic screw 132 is in the retracted position. Following a rotation of the ring nut 133, the telescopic screw 132 begins to extend, suitably compressing the spring 134, as illustrated in FIG. 28B. In FIG. 28C, the telescopic screw 132 is completely extracted, and the piston 131 has squeezed all the food sauce 6 through the dispensing means 5.

Advantageously, the extension and retraction of the telescopic screw 132 may be guided by a guide ring 135, sliding inside the body of the scoop 1 and adapted to hold the end of the telescopic screw 132 in an axial and central position during the extension of the same.

If necessary, a dispensing button 118 may also be present, for optionally preventing the dispensing of food sauce 6.

Advantageously, compression means 130 alternative to the telescopic screw 132 may also be provided. The telescopic screw 132, however, has the advantage of not occupying too much volume, inside the scoop 1, when in the retracted position.

Finally, the telescopic screw 132 may optionally be operated through motor means.

The scoop 1 may comprise a refrigeration system adapted to keep the food sauce 6 contained in said container 8 refrigerated.

Advantageously, the refrigeration system of the food sauce 6 may be provided in particular in the case where the food sauce 6 consists of, for example, whipped cream, mousse or other food to be stored cooled, even for a short period of time.

FIGS. 30A and 30B illustrate a further embodiment of the scoop 1 wherein the dispensing means 5 of the food sauce 6 comprise a dispensing tube 50 wherein a plurality of dispensing nozzles 7 is obtained. The dispensing tube 50 is movable between a first retracted position, illustrated in FIG. 30A, wherein it is completely inserted inside the scoop 1, and a second extracted position, illustrated in FIG. 30B, wherein it is extracted and protrudes inside the volume of the bowl 2.

Advantageously, the handle 3 comprises a threaded portion 200 intended to engage with a corresponding threaded portion 201 of an element 202 housed inside the handle 3 and associated at one end thereof with the dispensing tube 50. In this way, the relative rotation between the handle 3 and the element 202 causes the axial sliding of said element 202 inside the handle 3 and therefore the extraction or retraction of the dispensing tube 50.

The threaded coupling 200, 201 may be obtained inside the handle 3 or, as illustrated in FIGS. 30A and 30B, outside the handle 3. In this case, the element 202 inside the handle 202 is rigidly constrained to a cylindrical wall 204 external to the handle 3. The threaded portion 200 of the handle 3 is placed outside the handle itself, while the threaded portion 201 of the element 202 is placed in the inner face of the external cylindrical wall 204.

The food sauce container 8 may be obtained inside the element 202. The motion means 11 of the food sauce 6 may preferably comprise pressurization means 110 suitable for pressurizing the food sauce 6 contained in the container 8, or compression means suitable for squeezing the food sauce 6 contained in the container 8 towards the dispensing tube 50.

The food sauce container may also be obtained outside the handle 3, for example compatibly with the embodiments illustrated in FIGS. 19, 20 and 21.

Advantageously, as illustrated with reference to both FIGS. 30A and 30B and the respective variant of FIGS. 31A, 31B and 31C, the dispensing nozzles 7 are preferably arranged along the end of the dispensing tube 50 so as to face towards the bottom of the bowl 2.

According to the variant illustrated in FIGS. 31A, 31B and 31C, the handle 3 may comprise a moving end 150, which may be moved by hand to cause the dispensing tube 50 to be extracted.

Furthermore, according to a further variant, the pressurization means 110 take advantage of a particular configuration of the handle 3 in that they are defined by a moving end 150 of the handle 3, which may be moved by hand to squeeze the food sauce 6 present inside the container 8 and, at the same time, to cause dispensing tube 50 to be extracted.

The dispensing tube 50 is capable of retracting, in a manual mode or assisted by elastic means or actuators, once the ice cream sphere has been formed, to allow the extraction thereof from the bowl 2.

Thanks to the presence of the extractable dispensing tube 50, the ice cream sphere may be streaked preventing the sauce 6 from drying out on the inner surface of the scoop 1 and therefore preventing the nozzles 7 from becoming clogged.

Furthermore, the possibility of completely retracting the dispensing tube 50 inside the bowl 2 also allows the scoop to be used as a regular scoop.

The present invention further relates to bladed scoops, i.e. scoops which comprise a curved blade performing a 180° movement in order to separate the ice cream sphere from the inside of the bowl of the scoop.

In this case, the dispensing means of the food sauce may also be obtained on the blade itself, through suitable conduits capable of causing the food sauce to flow up to the blade itself. In this way, when the movement for detaching the ice cream sphere is made, the food sauce is distributed by the movement of the blade itself.

Finally, the present invention also relates to a method for the preparation of an ice cream or another semisolid consistency food portion, characterized in that it comprises the steps of:

providing an ice cream scoop 1 or scoop for another food of semisolid consistency, comprising a bowl 2 or spatula, a handle 3 carrying said bowl 2 or spatula, and dispensing means 5 of at least one food sauce 6;

moving said bowl 2 or spatula through a bulk of said ice cream or other food for obtaining a portion 4 in said bowl 2 or spatula, preferably a spherical portion, of said ice cream or other food, said dispensing means 5 of said at least one food sauce 6 dispensing said food sauce 6 on and/or within said ice cream or other food portion 4 during the formation of said ice cream or other food portion 4 in said bowl 2 or spatula.

In practice, it has been found that the ice cream scoop or scoop for another food of semisolid consistency according to the present invention fulfils the intended aim and objects in that it allows to garnish an ice cream portion with a food sauce, directly while the ice cream is being taken.

Another advantage of the scoop according to the invention consists in the possibility of forming an ice cream sphere the outer surface of which is 360° garnished by means of the spreading of food sauce.

A further advantage of the scoop according to the invention consists in the fact that it may also be used as a stand-alone utensil, with refillable or replaceable food sauce cartridges.

The scoop thus conceived allows numerous modifications and variations, all of which are within the scope of the inventive concept; moreover, all the details may be replaced by technically equivalent elements. In practice, any materials as well as any dimensions may be used, depending on the technical requirements.

In practice, any materials, so long as they are compatible with the specific use, as well as any contingent shapes and dimensions may be used, depending on the requirements.

The invention claimed is:
1. An ice cream portioner comprising:
an elongated handle shaped to be gripped manually;
a hemispherical bowl connected to the handle, the bowl shaped to create at least part of an ice cream ball when the bowl is slid over the surface of a semi-solid portion of ice cream, the bowl comprising:
at least one bowl surface; and
a dispensing portion comprising a slot or plurality of openings which open onto the at least one bowl surface, the slot or plurality of openings configured to supply an edible cream on an external surface of the ice cream ball and wherein the bowl further comprises: a longitudinal axis and a midline perpendicular to the longitudinal axis, wherein the midline bisects the bowl; and a dispensing portion that extends across the bowl in a direction from the handle to the distal end of the bowl and is intersected by the midline;
an elongated chamber extending axially inside the handle, the elongated chamber configured to interact with the edible cream under at least some pressure, the elongated chamber comprising:
an outlet;
at least one supply duct extending between the outlet and the dispensing portion; and
a separator element configured to fluidically separate the elongated chamber into a first chamber and a second chamber, the first chamber configured to:
house the edible cream; and
communicate the edible cream to the at least one supply duct, the second chamber configured to:
at least one of: store a pressurized gas, or house a gas pressure generator element; and
communicate the pressurized gas to act on the separator element to exert an action towards the first chamber to motivate flow of the edible cream to the at least one supply duct; and
a manually operated valve disposed along the at least one supply duct, the manually operated valve configured to regulate a quantity of the edible cream supplied to the external surface of the ice cream ball.

2. The ice cream portioner according to claim 1, wherein the edible cream is a food cream.

3. The ice cream portioner according to claim 1, wherein the at least one bowl surface comprises at least one of: an outer surface and an inner surface.

4. The ice cream portioner according to claim 3, wherein the at least one supply duct is at least partially located in the thickness of the bowl between the outer surface and the inner surface of the bowl.

5. The ice cream portioner according to claim 1, wherein the dispensing portion comprises a plurality of openings each positioned in an upper curve of the bowl, the upper curve being parallel to the longitudinal axis.

6. The ice cream portioner according to claim 1, wherein the plurality of openings are each positioned in a lower curve of the bowl, the lower curve being parallel to the longitudinal axis.

7. The ice cream portioner according to claim 1, wherein the plurality of openings are one or more dispensing nozzles, and the manually operated valve is a dispensing valve configured to be activated to allow dispensing of the edible cream.

8. The ice cream portioner according to claim 1, further comprising at least one of: a screw pushing device configured to provide a push action towards the first chamber to motivate the flow of the edible cream to the at least one supply duct, or a compression device configured to provide a squeeze action towards the first chamber to motivate the flow of the edible cream to the at least one supply duct.

9. The ice cream portioner according to claim 1, wherein at least one of the plurality of openings protrude from an inner surface of the bowl.

10. The ice cream portioner according to claim 1, wherein the plurality of openings comprise a closed position and an open position; and
wherein in the closed position radially protruding elements remain flush with an inner surface of the bowl, and in the open position the radially protruding elements protrude from the inner surface of the bowl.

11. The ice cream portioner according to claim 1, wherein the bowl comprises a cavity which houses a portion of the at least one supply duct.

12. Ice cream scoop comprising an elongated handle connected to a bowl having an inner surface said bowl being designed in use to collect an ice cream portion inside the bowl which forms, by rolling along the inner surface of the bowl, a spherical portion of said ice cream when said bowl is moved through a bulk of said ice cream, wherein said scoop comprises dispensing means of at least one food sauce contained in a container,
said dispensing means being located on the inner surface of said bowl and configured to dispense said food sauce during formation of said spherical portion so that the food sauce spreads on the outer surface of said ice cream sphere;
the dispensing means comprising one or more slots and/or a plurality of dispensing nozzles located in the vicinity of a substantially median area of the inner surface of the bowl, with respect to the direction of longitudinal development of the handle, said dispensing means being connected through a conduit to at least said one container containing said food sauce.

13. The ice cream scoop according to claim 12, wherein the dispensing means are dispensing nozzles that slightly protrude from the inner surface of the hemispherical bowl, so as to create a small groove on the outer surface of the ice cream sphere, while this is being formed; said food sauce is dispensed inside such groove.

14. The ice cream scoop according to claim 12, wherein said dispensing means are provided with a dispensing valve that is configured to be activated to allow dispensing of said food sauce.

15. The ice cream scoop according to claim 12 which comprises means for effecting movement of said food sauce from the container to the dispending means selected in the group consisting of:
pressurization means adapted to release gas under pressure to force said food sauce contained in said container towards the dispensing means;
pumping means adapted to pump said food sauce from said container to dispensing means;
screw pushing means adapted to take said food sauce from said container to push the same towards said dispensing means; and
compression means adapted to squeeze said food sauce contained in said container towards said dispensing means.

16. The ice cream scoop according to claim 15, wherein said means for effecting movement of the food sauce are compression means and comprise a compressible elastomeric tubing within which food sauce may be contained.

17. The ice cream scoop according to claim 15, wherein said means for effecting movement of the food sauce are housed in said handle.

18. The ice cream scoop according to claim 12 wherein said container containing a food sauce is located within said handle.

19. The ice cream scoop according to claim 12 wherein said handle comprises a peristaltic pump for pumping food sauce from said container to said dispensing means.

20. The ice cream scoop according to claim 12 wherein said container for food sauce is external to the handle and connected thereto by a conduit.

21. The ice cream scoop according to claim 12 wherein a check valve is located in the conduit linking said dispensing means to said container.

22. The ice cream scoop according to claim 12 wherein said handle houses a pressure generator and said pressure generator is a pressurized or pressurizable cartridge, containing said food sauce.

23. The ice cream scoop as claimed in claim 12 wherein said container for containing food sauce is removable from said handle and comprises a coupling device, for coupling said pressurized or pressurizable cartridge to said scoop.

24. The ice cream scoop according to claim 12, comprising a rinsing liquid dispensing nozzle connected, through a rinsing liquid conduit, to a container containing rinsing liquid; wherein said rinsing liquid nozzle is designed to rinse the bowl after use.

25. The ice cream scoop according to claim 24, wherein a container containing rinsing liquid is connected directly into said conduit for feeding the food sauce to the nozzles of said dispensing means whereby rinsing liquid may be used to rinse the nozzles themselves from the inside.

26. The ice cream scoop according to claim 12 which comprises a refrigeration system adapted to maintain refrigerated said food sauce contained in said container.

27. The ice cream scoop according to claim 12 wherein said conduit is connected to a container for food sauce that is external to the handle via a manual pump.

28. The ice cream scoop according to claim 12 wherein said conduit is connected to a container for food sauce that is external to the handle via a pump selected from the group consisting of peristaltic pumps, lobe pumps, diaphragm pumps and piezoelectric pumps.

29. The ice cream scoop of claim 28 wherein said container is connected to a plurality of other ice cream scoops comprising an elongated handle connected to a bowl having an inner surface said bowl being designed in use to collect an ice cream portion inside the bowl which forms, by rolling along the inner surface of the bowl, a spherical portion of said ice cream when said bowl is moved through a bulk of said ice cream, wherein said scoop comprises dispensing means of at least one food sauce contained in a container,
said dispensing means being located on the inner surface of said bowl and configured to dispense said food sauce during formation of said spherical portion so that the food sauce spreads on the outer surface of said ice cream sphere.

30. Ice cream scoop comprising an elongated handle connected to a bowl having an inner surface said bowl being designed in use to collect an ice cream portion inside the bowl which forms, by rolling along the inner surface of the bowl, a spherical portion of said ice cream when said bowl is moved through a bulk of said ice cream, wherein said scoop comprises dispensing means of at least one food sauce contained in a container,
said dispensing means being located on the inner surface of said bowl and configured to dispense said food sauce during formation of said spherical portion so that the food sauce spreads on the outer surface of said ice cream sphere;

the dispensing means comprising a plurality of dispensing nozzles located in the vicinity of a substantially median area of the inner surface of the bowl, with respect to the direction of longitudinal development of the handle, said dispensing means being connected through a conduit to at least said one container containing said food sauce, wherein said dispensing means are provided with a dispensing valve that is configured to be activated to allow dispensing of said food sauce; and wherein said container comprises a compressible elastomeric tubing within which food sauce may be contained to which pressure may be applied to force food sauce towards the dispensing means.

31. Ice cream scoop comprising an elongated handle connected to a bowl having an inner surface said bowl being designed in use to collect an ice cream portion inside the bowl which forms, by rolling along the inner surface of the bowl, a spherical portion of said ice cream when said bowl is moved through a bulk of said ice cream, wherein said scoop comprises dispensing means of at least one food sauce contained in a container, said dispensing means being located on the inner surface of said bowl and configured to dispense said food sauce during formation of said spherical portion so that the food sauce spreads on the outer surface of said ice cream sphere;

the dispensing means comprising a plurality of dispensing nozzles located in the vicinity of a substantially median area of the inner surface of the bowl, with respect to the direction of longitudinal development of the handle, said dispensing means being connected through a conduit to at least said one container containing said food sauce, wherein said dispensing means are provided with a dispensing valve that is configured to be activated to allow dispensing of said food sauce; and said container containing food sauce is external to the handle and linked thereto via a peristaltic pump.

* * * * *